(12) United States Patent
Jackson

(10) Patent No.: US 7,945,458 B1
(45) Date of Patent: May 17, 2011

(54) CARE FUNDING AND CARE PLANNING SYSTEM

(76) Inventor: Joseph A. Jackson, Lenox, MA (US)

( * ) Notice: Subject to any disclaimer, the term of this patent is extended or adjusted under 35 U.S.C. 154(b) by 366 days.

(21) Appl. No.: 12/150,564

(22) Filed: Apr. 29, 2008

Related U.S. Application Data

(60) Provisional application No. 60/927,797, filed on May 4, 2007.

(51) Int. Cl.
*G06Q 10/00* (2006.01)
*G06Q 50/00* (2006.01)
*A61B 5/00* (2006.01)
*G06F 19/00* (2006.01)

(52) U.S. Cl. .................................. 705/2; 705/3
(58) Field of Classification Search .............. 705/2–3
See application file for complete search history.

(56) References Cited

U.S. PATENT DOCUMENTS

| | | | |
|---|---|---|---|
| 5,301,105 A | 4/1994 | Cummings, Jr. | |
| 2002/0013520 A1 | 1/2002 | Okamoto | |
| 2002/0099568 A1 | 7/2002 | Turner et al. | |
| 2002/0128879 A1 | 9/2002 | Spears | |
| 2003/0130866 A1 | 7/2003 | Turner et al. | |
| 2004/0083122 A1 | 4/2004 | Allen et al. | |
| 2004/0204963 A1 | 10/2004 | Klueh et al. | |
| 2005/0038675 A1 | 2/2005 | Sickman et al. | |
| 2005/0202383 A1 | 9/2005 | Thomas et al. | |
| 2006/0190303 A1 | 8/2006 | Yourist et al. | |

FOREIGN PATENT DOCUMENTS

EP 1191472 A1 * 3/2002

* cited by examiner

*Primary Examiner* — Luke Gilligan
*Assistant Examiner* — Joy Chng
(74) *Attorney, Agent, or Firm* — Malcolm J. Chisholm, Jr.

(57) ABSTRACT

A care funding and care planning system (10) generates a care plan option report (192) for a care receiver. The system (10) includes a client computer (14) having an input data map (16) for receiving and storing care-receiver data (13) including predetermined, critical categories of care-receiver information. A system processor (36) processes the care-receiver data (13) through knowledge management software (12) to evaluate and select from the care-receiver data (13) at least physical functional status (72), cognitive and sensory status (74), prospective functional status (76), living environment status (84), and long-term care resource status abstractions (88). A meta needs-resource weighting engine (56) assigns care-receiver specific values (160A) to the care-receiver data abstractions (72). A dynamic data base (48) allocates values to the weighted care-receiver data abstractions (72). A report generator (58) produces a care plan options report (192) for the care receiver.

9 Claims, 22 Drawing Sheets

Care Funding Care Planner
(CFCP)
Overview

Operation Internal (Overview)

Operation Internal
Physical Functional Status Abstraction

Operation Internal
Cognitive / Sensory Status Abstraction

Operation Internal Resources Abstraction

Operation Internal
Data Abstractions

Case Examples

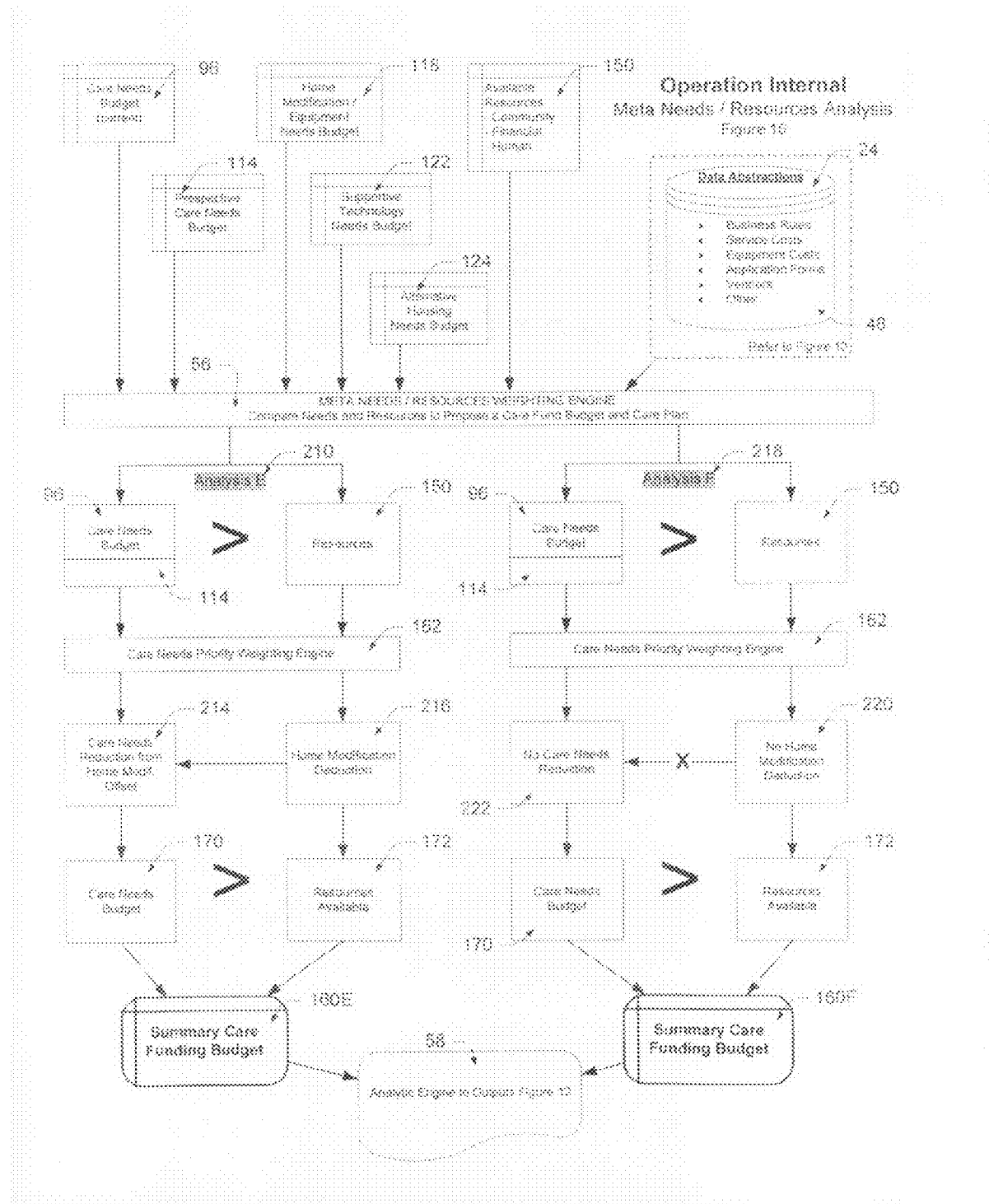

FIGURE 17A

CARE FUNDING CARE PLANNING SYSTEM DATA ENTRY FIELDS

A. Client Information

Client Name (First Name Only): [___]    Spouse's First Name Only: [___]

Age: [___]    Spouse's Age: [___]

Gender: [ f ▼]    Spouse's Gender: [ f ▼]

Marital Status: <u>Married</u> (If not married, please use plan for single/widow(er)

State of Residence: [ Pennsylvania ▼]    City/Town: [___]    Zip Code: [___]

B. Living Situation

[ Lives alone ▼]

Spouse in home
Spouse and adult child(ren) in home
Adult child(ren) in home
<u>Friend in home</u>

C. Functional Status *(Click appropriate button. Modify estimated hours if needed.)*

|  | Independent | Needs Some Assist | Needs Full Assist |
|---|---|---|---|
|  | (Est. hours p/week) | (Est. hours p/week) | (Est. hours p/week) |
| Bathing | ☐ | ☐ | ☐ |
| Dressing | ☐ | ☐ | ☐ |
| Toileting | ☐ | ☐ | ☐ |
| Walking | ☐ | ☐ | ☐ |
| Transfers (Bed to Chair) | ☐ | ☐ | ☐ |
| Eating | ☐ | ☐ | ☐ |
| Telephone Use | ☐ | ☐ | ☐ |
| Driving | ☐ | ☐ | ☐ |
| Meal Preparation | ☐ | ☐ | ☐ |
| Shopping | ☐ | ☐ | ☐ |
| Cleaning | ☐ | ☐ | ☐ |
| Laundry | ☐ | ☐ | ☐ |
| Making Appointments | ☐ | ☐ | ☐ |
| Arranging Transportation | ☐ | ☐ | ☐ |
| Bill Paying | ☐ | ☐ | ☐ |
| Overnight Assistance | ☐ | ☐ | ☐ |

FIGURE 17B

|  | Does Not Use | Uses Part time | Uses Full time |
|---|---|---|---|
| Walker | ☐ | ☐ | ☐ |
| Cane | ☐ | ☐ | ☐ |
| Wheelchair | ☐ | ☐ | ☐ |

D. Sensory Abilities

|  | Not Impaired | Slightly Impaired | Significantly Impaired | Total Loss |
|---|---|---|---|---|
| Vision | ☐ | ☐ | ☐ | ☐ |
| Hearing | ☐ | ☐ | ☐ | ☐ |
| Smell | ☐ | ☐ | ☐ | ☐ |
| Touch (Lower Extremities) | ☐ | ☐ | ☐ | ☐ |
| Touch (Upper Extremities) | ☐ | ☐ | ☐ | ☐ |

E. Cognitive Abilities

|  | Not Impaired | Slightly Impaired | Significantly Impaired | Total Loss |
|---|---|---|---|---|
| Short Term Memory | ☐ | ☐ | ☐ | ☐ |
| Long Term Memory | ☐ | ☐ | ☐ | ☐ |
| Verbal Expression | ☐ | ☐ | ☐ | ☐ |
| Written Expression | ☐ | ☐ | ☐ | ☐ |
| Follows Instructions | ☐ | ☐ | ☐ | ☐ |
| Reporting | ☐ | ☐ | ☐ | ☐ |

F. Orientation/Emotional Status

|  | All of the time | Most of the time | Some of the time | None of the time |
|---|---|---|---|---|
| Alert | ☐ | ☐ | ☐ | ☐ |
| Confused | ☐ | ☐ | ☐ | ☐ |
| Recognizes Family | ☐ | ☐ | ☐ | ☐ |
| Knows Where He/She is | ☐ | ☐ | ☐ | ☐ |
| Knows Time of Day | ☐ | ☐ | ☐ | ☐ |
| Knows Day of Month | ☐ | ☐ | ☐ | ☐ |
| Knows Current Season | ☐ | ☐ | ☐ | ☐ |
| Knows Current Year | ☐ | ☐ | ☐ | ☐ |
| Delusions | ☐ | ☐ | ☐ | ☐ |
| Hallucinations | ☐ | ☐ | ☐ | ☐ |
| Paranoia | ☐ | ☐ | ☐ | ☐ |
| Anxiety | ☐ | ☐ | ☐ | ☐ |
| Depression | ☐ | ☐ | ☐ | ☐ |
| Euphoria | ☐ | ☐ | ☐ | ☐ |
| Psychosis | ☐ | ☐ | ☐ | ☐ |

FIGURE 17C

Irrational Fear ☐ ☐ ☐ ☐
Dementia ☐ ☐ ☐ ☐

G. Current or Recent Health Problems / Risk Factors that May Affect Care Needs

- ☐ CHF
- ☐ COPD
- ☐ Spinal Cord Injury
- ☐ Diabetes
- ☐ Cancer
- ☐ CVA
- ☐ PVD

- ☐ Head Injury
- ☐ Alzheimer's / Other Dementia's
- ☐ Parkinson's / Other
- ☐ Neurodegenerative Disease
- ☐ Osteoporosis
- ☐ Chronic Pain
- ☐ Fractures – Hip and Knee

- ☐ Arthritis
- ☐ Contractures
- ☐ Amputations
- ☐ Pressure Ulcer
- ☐ Obesity
- ☐ Diabetes
- ☐ Cellulitis

- ☐ Falls / Unsteadiness
- ☐ Ocular Disease
- ☐ Impaired Hearing
- ☐ Substance Misuse:

H. Advance Directives

Power Of Attorney: [y ▼]   Health Care Proxy: [y ▼]   Living Will: [y ▼]

Will: [y ▼]   "Do Not Resuscitate" Order (DNR): [y ▼]

I. Health Insurance

Primary Health Insurance: [Medicare ▼]
  Commercial Ins.
  Medicare Advantage
  Medicaid Medicare B: [y ▼]   Medicare Supplement: [y ▼]   Medicare D: [y ▼]
Medicaid: [y ▼]   Prescription Benefit: [y ▼]

Long Term Care Ins: [y ▼]
If yes:
  Daily Benefit [ ]
  Elimination Period: [ ]

Veteran: [y ▼]

Deceased Veteran's Spouse: [y ▼]

Enrolled at VA Health Clinic: [y ▼]

J. Housing   *(Please note: Do not use $ sign, commas or decimals when entering numbers.)*

[Rents primary residence ▼]

FIGURE 17D

Primary Residence individually owned
Primary Residence jointly owned between spouses
Primary Residence jointly owned with an adult child
Primary Residence owned by an adult child/family member

*If Primary Residence Individually held or Jointly held between Spouses:*

Primary Residence Value: [      ]

Primary Residence Equity: [      ] %

K. Are you currently enrolled in any community support services, local, state or federal programs for the following benefits?

☐ Personal care services ☐ Meal delivery ☐ Chore services
☐ Shopping ☐ Cleaning ☐ Laundry
☐ Meal preparation ☐ Pharmaceutical assistance ☐ Housing subsidy
☐ Income supports ☐ Home modification ☐ Transportation

L. Family Support

Spouse capable of hands-on assistance: [ y ▼ ] Available Hours Per Month: [      ]

Adult Daughters: [   ]   Living within 1 Hr: [   ]   Available Hours Per Month: [   ]

Adult Sons: [   ]   Living within 1 Hr: [   ]   Available Hours Per Month: [   ]

Adult Sons: [   ]   Living within 1 Hr: [   ]   Available Hours Per Month: [   ]

☐ Caretaker Child Exception
(Adult children who move in and/or live in the home with care receiver MAY qualify)

M. Environmental Factors

⦿ Single Family home  ○ Apartment

If Single Family home, number of stories: [                ]

If Apartment Building, floor of residence: [          ]

Number of bedrooms: [    ]   Number of full bathrooms: [    ]

*Internal barriers:*

Stairs to bedroom(s): [ n ▼ ]   Bedroom on first floor: [ n ▼ ]

Full bath on first floor: [ n ▼ ]

Full bath accessible (admits wheelchair; not crowded for 2 people): [ n ▼ ]

Stairs separating rooms: [ n ▼ ]

FIGURE 17E

Doors/hallways accessible to wheelchair: [ n ]

*External barriers:*

First floor of living space above ground level by: [ no stairs ]

Existing Wheelchair Accessible Ramp: [ n ]

Exterior lighting adequate: [ n ]     Home setting: [ rural ]

N. Monthly Income: (Please note: Do not use $ sign, commas, decimals when entering.)

| | Client | Spouse |
|---|---|---|
| Social Security Retirement: | | |
| Social Security Disability (SSDI): | | |
| Supplemental Security Income (SSI): | | |
| Pension: | | |
| Annuity: | | |
| Earned Income: | | |
| Rental Income: | | |
| Other Income: | | NOT Investment Income |

O. Monthly Cost of Living (Do not use $ sign, commas or decimals when entering.)

From Cost of Living Calculator [ ]

FIGURE 17F

P. Available Assets Held: (Do not use $ sign, commas or decimals when entering.)

|  | Client Individually | Spouse Individually | Client and Spouse Jointly | Client and Adult Child Jointly |
|---|---|---|---|---|
| Revocable Annuities: | | | | |
| CDs: | | | | |
| Stocks: | | | | |
| Annuity: | | | | |
| Mutual Funds: | | | | |
| Bonds: | | | | |
| IRAs: | | | | |
| Life Insurance Cash Value: | | | | |
| Life Insurance Face Value: | | | | |
| Savings: | | | | |
| Checking: | | | | |
| Funeral Account: | y | y | | |
| Revocable Trusts: | | | | |
| Other available Assets: | | | | |

Q. Asset Transfers (Please note: Do not use $ sign, commas, decimals when entering.)
Please indicate if assets were transferred (or "gifted") by client or spouse within the last five years.

To an Individual: n    If yes: Amount of transfer: ____    Date of transfer: ____
To an Organization: n    If yes: Amount of transfer: ____    Date of transfer: ____
To Revocable Trust: n    If yes: Amount of transfer: ____    Date of transfer: ____
To Irrevocable Trust: n    If yes: Amount of transfer: ____    Date of transfer: ____

[Write Report]

CARE FUNDING AND CARE PLANNING SYSTEM

CROSS REFERENCE TO RELATED APPLICATION

This Application claims the benefit of U.S. Provisional Patent Application Ser. No. 60/927,797 that was filed on May 4, 2007, entitled "Care Funding and Care Planning System".

TECHNICAL FIELD

The present invention generally relates to a care funding and care planning system for entry of care-receiver data by multiple care administrators for processing of the data by the system to generate care funding and care planning option reports for the care receivers. More particularly, data of an individual care-receiver is selected, entered and processed by the system to evaluate critical variables affecting long-term care options and care-payment arrangements for the care receiver. The system thereby assists care receivers, their families and professional advisors with decision making and option selection to produce a comprehensive plan for the care receiver.

BACKGROUND ART

"Health care" today focuses primarily on the treatment of illness and injury. Physicians, surgeons, nurses, and therapists work in an organized, highly-regulated system that responds to illness and injury after their occurrence. The care provided in this system begins with an allopathic diagnosis that is followed by treatment protocols heavily reliant on pharmaceuticals, surgical procedures and complex medical equipment. This system is primarily institution-based, and is subsidized by a third-party network of health insurance companies and government programs. Care giving venues are separately administered, with patients passing from one venue to the next along a treatment continuum depending on their level of acuity.

Since the health care system is not set up to foster wellness, but rather to respond to acute illness and injury, it is perhaps less a "health care" system than it is a "sickness-care" system. And the bulk of its patients—chronically ill, physically-disabled or frail-elderly people—receive ongoing acute-care services for exacerbations and complications of illnesses and conditions that cannot be cured. This system of reactive care does not offer concomitant adequate prevention services that educate and empower people to remain well, despite the growing emphasis on reducing unplanned hospitalizations and emergency room visits among those most vulnerable to severe illness and injury. For the most part, long-term care consumers interested in staying out of the hospital are left to their own devices, with or without the help of their families. The system through which consumers access community-based, long-term care supports is a difficult-to-negotiate patchwork of social service and disability-care services with multiple points of entry. Access professionals, including aging services social workers, health system case managers and social workers, and legal advocates differ in their knowledge base and assessment protocols.

Therefore, the health care system of the United States of America invariably confronts chronically ill, physically or cognitively disabled, or frail elderly health care receivers with significant inadequacies of the processes of care management, planning and funding. First, many parts of the social service and health care systems are inconsistent and disconnected. Indeed, the only point of convergence and continuity in the current system is the client and his or her family themselves. Patients and clients are passed from venue to venue, and from system to system, and are often subjected to redundant assessments and evaluations, with little information passing from one health care "silo" to another health care "silo" of each such venue. Second, the information clients are given from one venue to the next, and one worker to the next, is often incomplete, inaccurate, or both. This results from inconsistent knowledge and training for discharge planners, case managers or social workers serving clients across the continuum as to the nature and access rules for long-term prevention care programs.

Third, there are no consistent, standardized assessment protocols and no standardized teaching protocols as to the long-term care supports available in community settings. Fourth, because of short-term-stay models that dominate in-patient health care, and because of short-term and intermittent care models in rehabilitation and home health care services, and because of large caseloads carried by social workers in community-based aging and disability services, clients in need of long-term care support services and their families do not receive the kind of in depth planning, teaching and advocacy services they need. Moreover, as is the case for most people, such care receivers cannot afford to buy long-term care insurance, or are ineligible for coverage to begin with, or they cannot afford to pay for the care they need for as long as they need such long-term care. Fifth, and perhaps most importantly, there is no resource-planning component that assists long-term care consumers to develop care-funding plans that will enable them to actually organize their own resources and/or acquire the resources they need to pay for the prevention-focused, long-term, community-based care that supports and promotes the reduction of unplanned hospitalization and emergency room visits among those most vulnerable to requiring unplanned in-patient care.

Accordingly, there is a need for a solution to the problems created by the present non-standardized process of long-term care funding and care planning.

SUMMARY OF THE INVENTION

The invention is a care funding and care planning system for generating a care plan option report for a care receiver. The system includes a client computer for receiving and storing care-receiver data, wherein the client computer includes a user interface data map for selecting predetermined care-receiver data to be received and stored by the client computer. A system processor is in communication with the care receiver data stored within the client computer for processing the care-receiver data through knowledge management software. The system processor includes a data abstraction processing capability for selecting and evaluating from the care-receiver data several critical categories of information about the care receiver. The categories include current physical functional status abstractions, current cognitive and sensory status abstractions, prospective functional status abstractions (physical, cognitive and sensory), living environment status abstractions, and long-term care resource abstractions. The system processor also includes a meta needs/resource weighting engine that assigns care-receiver specific values to the care-receiver data abstractions. The care funding care planning software of the system processor also includes a dynamic data base in communication with the system processor for allocating values to the weighted care-receiver data abstractions. A report generator of the system processor is also in communication with selected and processed data and produces a care plan options report output for the care receiver based upon the processing and weighting of the care-receiver data abstractions.

In a preferred embodiment, a care administrator would communicate directly with a care receiver and/or his or her family, and/or long term care advisor and input the care-receiver data into the client computer. The system may include the client computer as a computer at a visiting nurses facility, a lawyer's office, a bank, or a portable computer utilized by the care administrator in visiting the care receiver, wherein the system processor is maintained in a remote server in communication with the client computer by a private network, or the internet, etc. In an alternative embodiment, the system processor may be included within the client computer, or may be in communication with the client computer through other communication technologies known in the art.

Exemplary care administrators include Pension Benefit Administrators, Health Plan Administrators, Long-Term Care Insurance Administrators, Health System Professionals, Long-Term Care Facility Professionals (Nursing homes), Rehabilitation Facility Professionals, Home Health Agency Professionals (both Medical Home Care and Non-Medical Home Care), Disease Management Professionals, Employee Assistance Program Administrators, Estate Planning and Financial Planning Professionals, Social Service Professionals, Geriatric Care Managers, Long-Term Care Consumers and their families, and other advisors and agents of influence assisting chronically ill, or physically disabled, or cognitively disabled, or frail-elderly long-term care consumers. By specifically evaluating critical data of the care receiver, and then allocating a weighted value to the various data abstractions, the system provides a comprehensive care plan option report that includes consideration of the long-term care needs of the care receiver, that include personal care assistance, home-making help (shopping, cleaning, laundry, transportation, for example), chore services, estate planning and/or financial planning assistance, insurance analysis, social supports, home modification needs, community resource referrals and applications, medical condition monitoring and care management, and so on. The many advantages of the care funding care planning system of the present invention are easily demonstrated by the following example that highlights many problems stemming from the lack of standardization in assessment, knowledge, teaching tools, advocacy and referrals in a community-based long-term care system, as compared to the high degree of standardization in the institution-based, acute-care treatment system.

One example of the utility of the present invention is highlighted as follows: A care receiver that is a home care consumer is diagnosed with a combination of chronic illnesses and conditions, including Chronic Obstructive Pulmonary Disease, Congestive Heart Failure, Cellulitis of the Lower Extremities, and Osteoporosis. She is referred for home care following discharge from the rehabilitation facility, where she had recovered from recent hip replacement surgery. She is 80 years old, taking multiple medications, mobility-impaired, incapable of bathing or dressing herself safely, living with her 81-year-old husband, himself diagnosed with early stage Alzheimer's disease. The client and her husband own their own modest home, worth approximately $200,000, with an outstanding home equity loan of approximately $40,000. Each has Social Security Retirement Income of $790 and $1000 per month respectively. Her husband also has a pension of $150 per month. They have approximately $59,000 in assets held jointly and individually, of which approximately $2000 and $8000 are in cash value in life insurance policies respectively. They have two daughters and one son, all living locally within one hour of their home. The client is referred to the visiting nurse agency following discharge from the hospital (her tenth hospitalization in five years), and is interviewed by the home care agency social worker, from whom she has requested help due to her inability to pay for medications following the cessation of benefits at the end of the year under Medicare D. Finally, her husband is also requesting help, since the home equity loan that was taken to meet expenses, now has a monthly payment in excess of $400 per month. He has taken a job just to make the payments.

By utilizing the care funding care planning ("CFCP") system, the home health care social worker recognizes immediately what no social workers or case managers in the health system or social service system had recognized in the preceding five years. First, neither the client nor her husband had a Power of Attorney, thus both their home and savings were at risk if either or both became incapacitated. A referral to an elder law attorney was made. Second, with only minor planning advice, the client was made eligible for the Community Frail Elder Medicaid Waiver that would provide chronic care services in the home in adequate supply (and that were sorely needed), would cover medications with no cessation of benefits at year end, and would provide medical transportation benefits ensuring appropriate wheelchair equipped transport for appointments.

Apparently these benefits had not been obtained because no social service or health care advisors knew to tell the client, her husband or their adult children that the $22,000 held in both their names could be placed in an account in the husband's name only and the client would be immediately eligible. The CFCP system interpreted this prospective eligibility planning option instantly. Third, no one had told the family of the potential benefit of a reverse equity mortgage that would eliminate the home equity loan payments as well as the need for this 81-year-old with early stage Alzheimer's disease to work. Fourth, no one had advised the family of their eligibility for a home modification loan program that would install a ramp and an accessible bath to increase the client's safety at home, despite the that fact that her previous hospitalization was the result of a fall, with subsequent hip fracture and hip replacement surgery.

Accordingly, a goal of the present CFCP system is to achieve a method of facilitating and standardizing: 1) the assessment of needs and resources available to frail elders and people with disabilities, 2) the planning process by which those resources are organized and acquired, and 3) the decision-making process whereby the most vulnerable long-term care consumers and their families can organize their own financial, community and family resources, as well as modify their living environments, and otherwise plan for their long-range care needs to be met in the least restrictive setting of their choice, and that overcomes the disadvantages of the current system and processes.

BRIEF DESCRIPTION OF THE DRAWINGS

FIG. 16 is a schematic representation of the Meta Needs/Resources Weighting Engine (internal operation), Analysis E and Analysis F for the CFCP information exchange system.

FIGS. 17A-17F are a sequence of portions of a completed sample data input map including information for generating a care planning and are funding system.

DETAILED DESCRIPTION OF THE PREFERRED EMBODIMENTS

Figure 1:
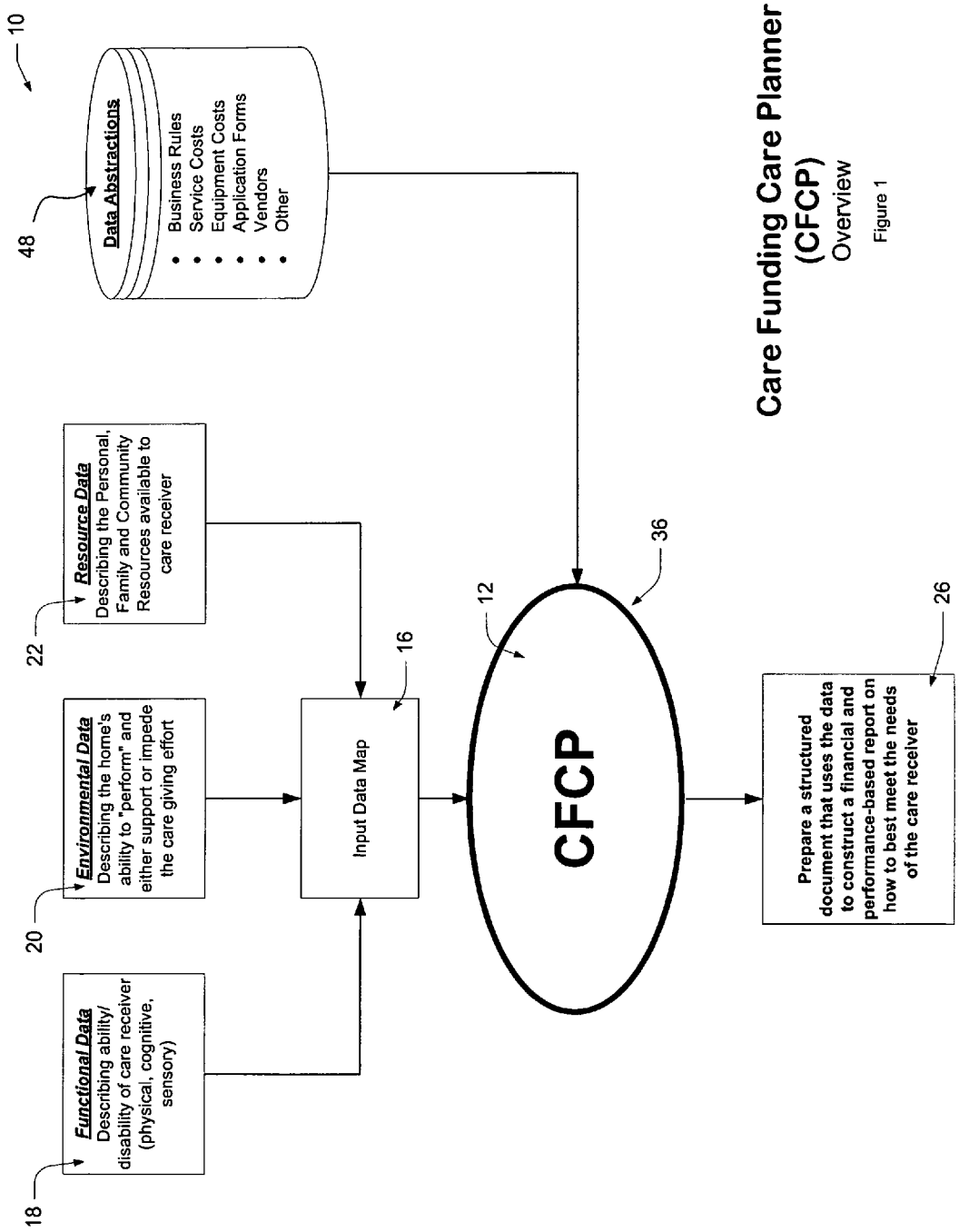
FIG. 1 is a schematic representation of an overview of a Care Funding Care Planning (CFCP) information exchange system, in accordance with a preferred embodiment of the present invention.
Figure 2:
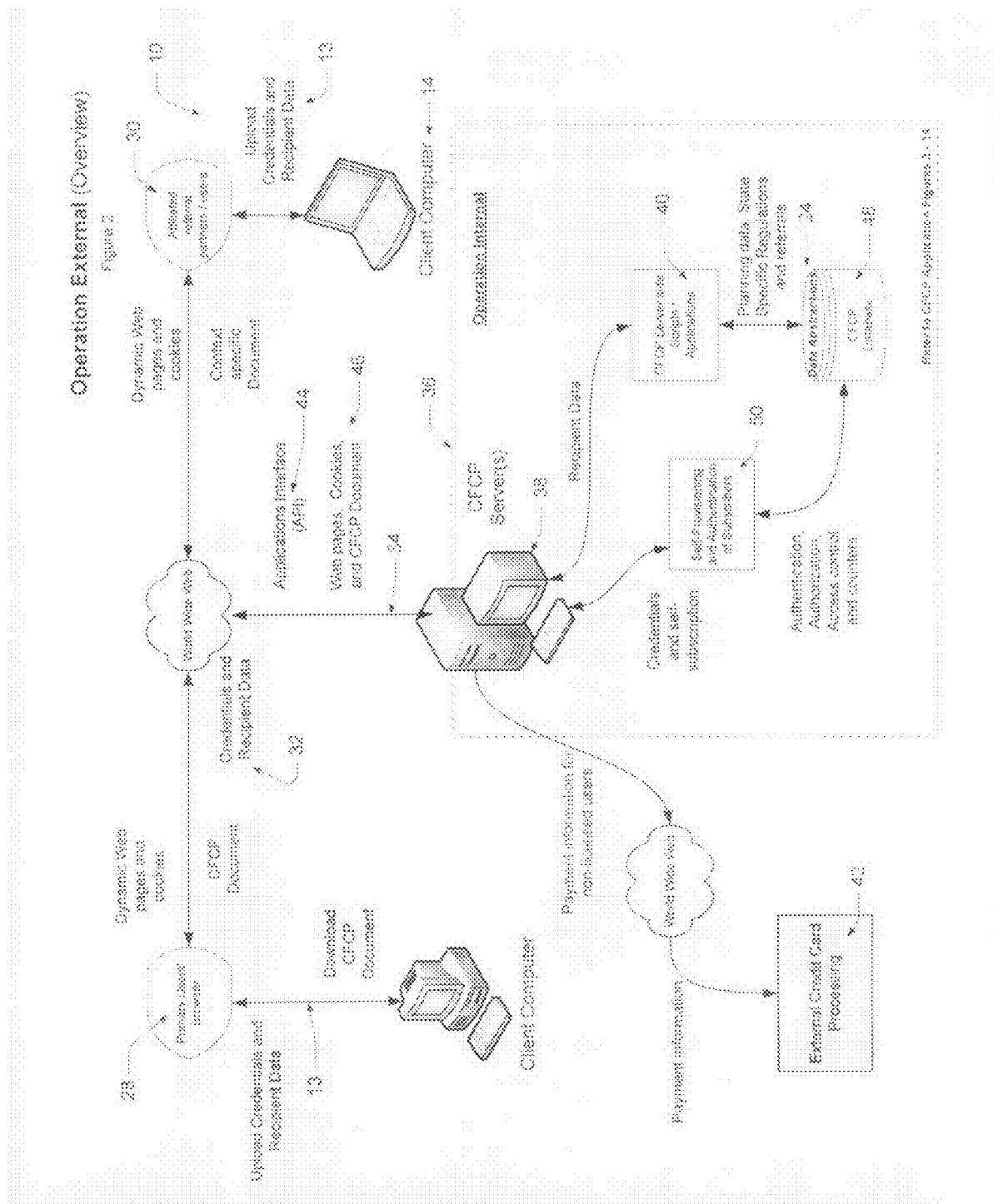
FIG. 2 is a schematic representation of an overview of the external operation of the CFCP information exchange system.

The care funding care planning system of the present invention is best shown in simplified schematic form in FIGS. 1 and 2 and is generally designated by the reference numeral 10. FIGS. 1 and 2 illustrate the CFCP system 10, in accordance with a preferred embodiment of the present invention. The CFCP system 10 generally includes knowledge management software 12 that receives care-receiver data 13 from a client computer 14 that receives the data 13 from a manually completed data map 16 that may be within the client computer 14. The care-receiver data 13 includes the functional data or status 18, the environmental data or status 20, and data regarding the personal, community, and financial resources 22 available to care receivers (not shown) seeking long-term care services in a community or other long-term care setting. The knowledge management software 12 processes data through high-level data abstractions 24 to prepare a structured document 26 that uses the data to construct a written, financial and performance-based care plan options report on how to best meet the needs of the care receiver.

FIG. 2 illustrates an overview of the external operation of the CFCP information exchange system 10, as shown in FIG. 1, in accordance with the preferred embodiment of the present invention. The system 10 is intended for use by primary user care administrators 28 that include for example long-term care consumers and their families, and that may also include, without limitation, other referral partners and institutional users 30 such as professional health care, social service, care management, financial, legal, employee assistance, pension administrators, health administrators, insurance advisors and other agents of influence in the lives of those care receivers needing ongoing support with activities of daily living. The CFCP system 10 provides support, guidance, planning options and financial-support options for consumers of long-term care services and for those responsible for assisting with the care of individuals unable to care for themselves. Following manual insertion of data 13 into the client computer 14, the CFCP system 10 may also upload or transfer the care administrator credentials 32 and recipient data to the primary user's browser, which may be processed by transferring data to the World Wide Web via dynamic pages and cookies 34 and to the CFCP system processor 36, which may be housed within a system server 38 for internal operation processing 40, and external credit card processing 42. The content specific document care plan options report 26 is then transferred, such as via the web or other known communication apparatus back to the primary user 28 or affiliated referral partner users 30 to complete the report transfer process.

The CFCP system 10 is preferably represented as an internet-based Software-as-a-Service (SaaS) application implemented on a browser, but can also be made available by distribution on CD-ROM software with downloadable or purchasable upgrades. Internal to the CFCP system 10, referring partners/associations and clients can interface to the CFCP server 38 through its Application Interface (API) 44. The CFCP API is facilitated through the use of cookies environment variables and share code 46. The CFCP server 38 may consist of front-end web servers 38 known in the art that provide dynamic HTML pages to client requests, and back-end database information servers 38 that fulfill transactional requirements described below. The database servers 48 are servers running a DBMS that support compliant Structured Query Language (SQL) requests passed through an Open Database Connectivity (ODBC) middle layer. Client requests are made using industry standard browsers (i.e. Internet Explorer, Mozilla, Netscape, etc.) as long as they are Hyper Text Transfer Protocol (HTTP) 1.0 compliant over the Internet. Both web servers 38 and database servers 48 can be fully load balanced with high availability and thus provide a highly dependable and scalable platform in which to host the CFCP system 10 solution and its described functions.

Further best practices for web server 38 and database server 48 solutions may include: a. hot swappable drives with fully Redundant Array of Inexpensive Drives (RAID) level five (5) or greater; b. outside firewalls in front of web server and inside firewalls between web server and database servers; c. use of proxy servers and/or content Authentication Authorization and Access control (AAA) security mechanisms; and, d. tape backup and retention of both software and data from CFCP system 10 Front-end Web server(s) and back-end database server(s).

Most of the content served to browsers on client computers 14 is in the form of dynamically constructed pages served at run-time. Care recipients and/or providers access the Internet via office connections, DSL, Cable, or dialup to their local Internet Service Provider (ISP), where they would request the CFCP by use of their browser and the Universal Resource Locator (URL) for the CFCP website. The protocols used by the CFCP server configuration may be those typically used by a web-based solution. Those are: a. transmission Control Protocol (TCP) over Internet Protocol (IP) commonly referred to as TCP/IP; b. HTTP 1.0; c. user Datagram Protocol (UDP); and, e. Internet Control Message Protocol (ICMP). The protocols used by the internal CFCP configuration may be those typically used by a CD-ROM.

FIG. 2 also illustrates the internal operation process that transfers recipient data 13 for analysis via CFCP system 10 server side scripts and applications 40. Relevant planning data, state specific regulations and referrals 40 are retrieved, interpreted, and processed via information in the CFCP system 10 data base 48. Subscriber authentication, authorization and access controls 50 verify user credentials and self subscription.

Figure 3:
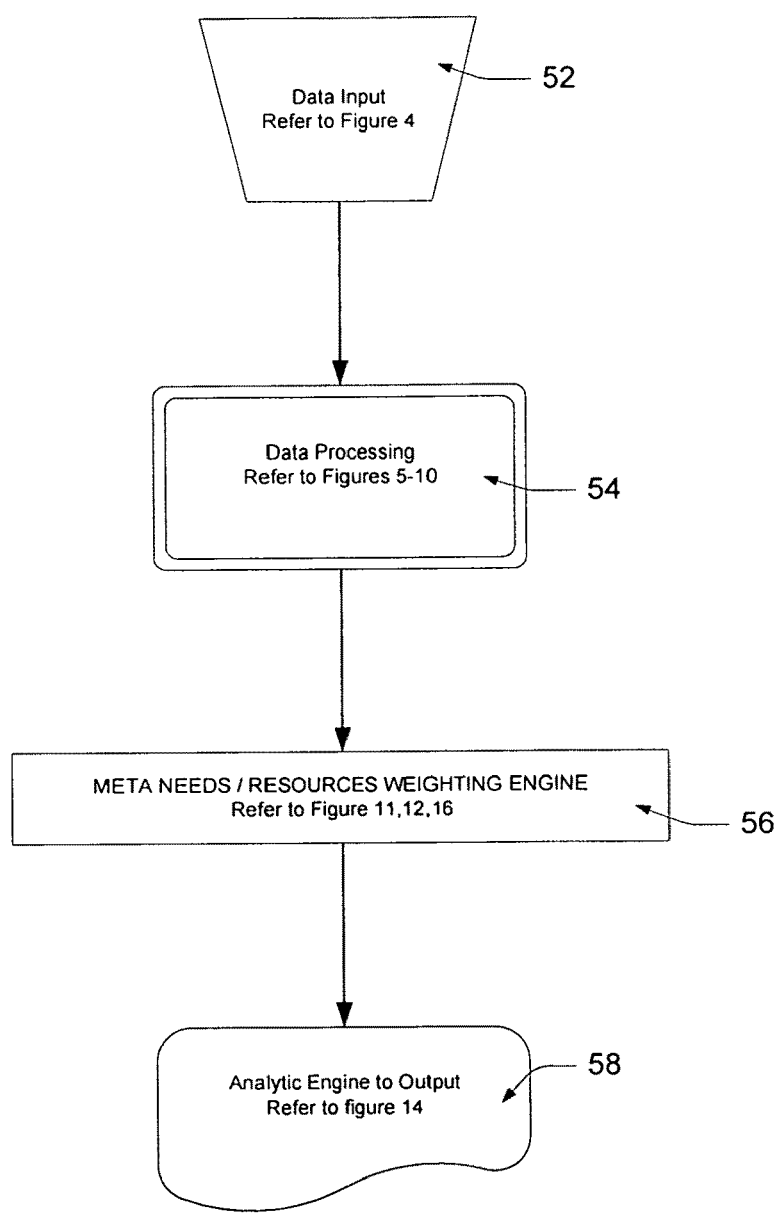
FIG. 3 is a schematic representation of an overview of the internal operation of the CFCP information exchange system.

FIG. 3 illustrates an overview of the internal operation of the CFCP information exchange system 10, as shown in FIG. 1, in accordance with the preferred embodiment of the present invention. The overall internal operation of the CFCP system 10 provides accurate, reliable, real-time access to long-term care funding and long-term care planning knowledge via four primary processes that include data input 52, data processing 54, meta needs and resources weighting via data abstraction and needs fulfillment analysis 56, resulting in care plan options report 26 report generating output means 58 and referrals. Unique care-receiver data 13 is inputted, stored, or retrieved from existing data bases 48, processed 54, weighted as to care-funding and care-planning needs through a unique, individualized cross-referencing and weighting process 56, and is passed to an analytical operating rules engine 58 that interprets unique care-receiver data 13 concerning long-term care planning options, costs, community resource eligibility rules, institutional resource eligibility rules, technology supports, financial support services, human support services, and advisories for review by clients, their families and their professional advisors in the form of the CFCP system output options report 26. The CFCP system 10 solves problems associated with inconsistency in knowledge between social service, health care, legal and financial advisors across the resource management and care management continuum, expedites the care-funding and care-planning process, and eliminates the administrative burden and cost of manual and direct-service processes of report writing, telephone consultations, and face-to-face meetings heretofore required to facilitate the long-term care planning, teaching, and decision-making process for clients and their families.

Figure 4:
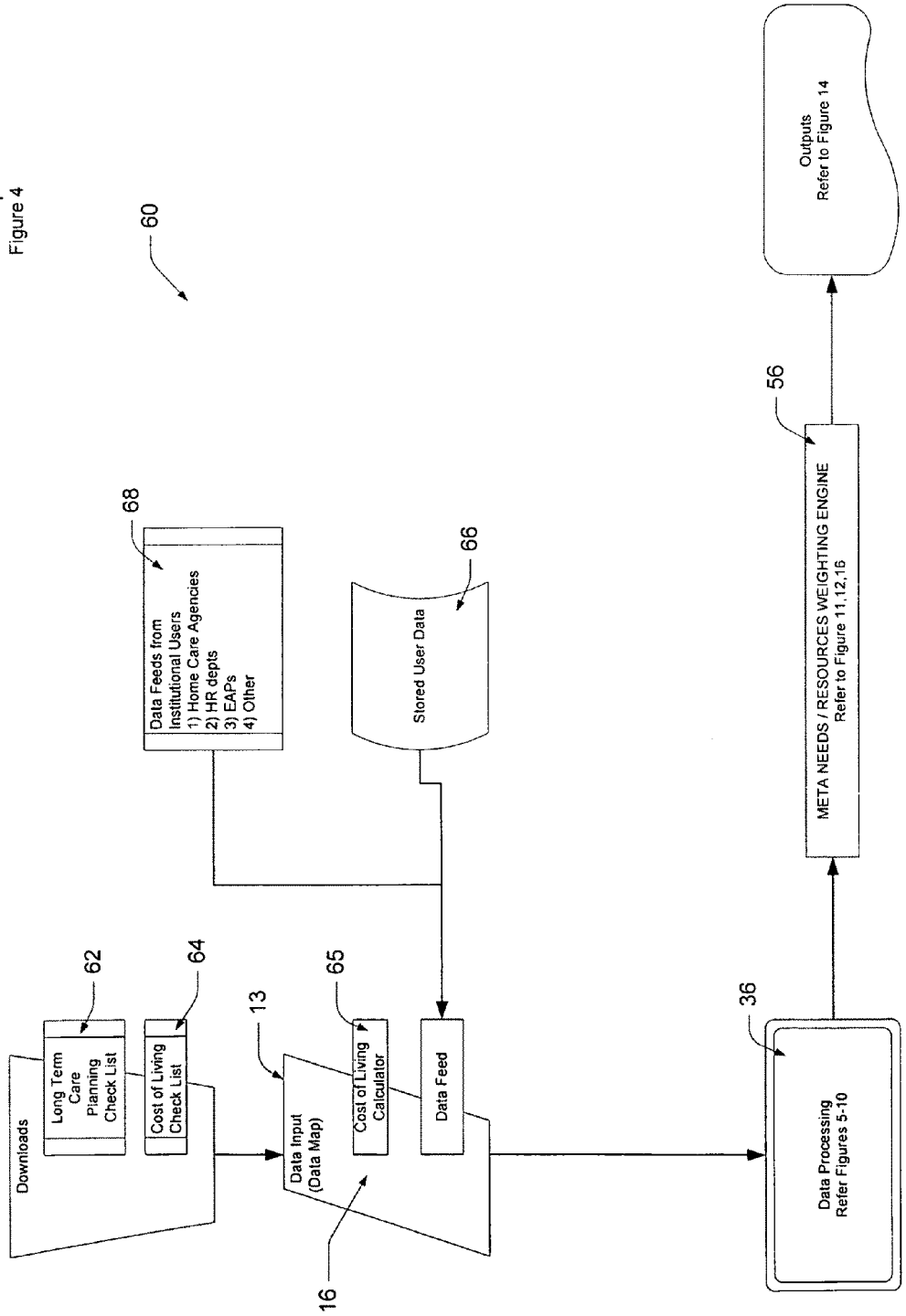
FIG. 4 is a schematic representation of the user interface, data input and data feed data processes of the internal operation of the CFCP information exchange system.

FIG. 4 illustrates a user interface 60, data input and data feed processes of the internal operation of the CFCP information exchange system 10, as shown in FIG. 1, in accordance with the preferred embodiment of the present invention. Users download a manually completed care-planning checklist 62 and cost-of-living checklist 64, from which they manually input care-receiver data 13 to a data input map 16 and cost of living calculator 65 that is subsequently interpreted and analyzed by the CFCP system processor 36. Data is also transferred to the CFCP system processor 36 from a stored user data bank 66 that holds inputted data previously entered by a care receiver who chose to complete the data input map in more than one session, returning to their stored data following session one, or that has otherwise previously entered care-receiver data. Data is also inputted to the CFCP system processor 36 through data feeds from institutional user data banks 68, such as from home care agencies, employee assistance programs, pension administrators, health administrators, insurance and financial companies, and other institutional users. Following processing by the CFCP system 10, care-receiver data 13 is passed to the Meta needs/resources weighting engine 56, and is then passed to the analytic engine 58 and on to report generating output means 58 for producing the care plan options report 26.

The care administrator (not shown) user(s) of the CFCP system 10 keep the care receiver (not shown) completely anonymous by simply not using their last name, and/or by using initials only, and/or by using an identifier number only that is unrelated to client's age, date of birth, telephone number, Social Security number, credit card number or any other personal numeric identifier. The CFCP system 10 does not store any personal identifier information on the host server 38 and therefore may be fully compliant with the Health Insurance Portability and Accountability Act (HIPAA). The compiled information is sent back to the user's browser within the client computer 14 in the form of cookies, rich text format or a PDF document. An institutional user 30 is responsible for adhering to both the principal and spirit of the HIPAA laws. In so doing the client computer 12 and/or system server 30 can be kept HIPAA compliant. Stored, non-confidential information to which clients return following incomplete data input sessions may be protected by 128/256 bit encryption to insure privacy of communications and multi-factor authentication ensuring accurate customer identification for linking with accurate data retrieval. Data-level authorization and access control enforces individual, exclusive access to their own data, and restricts access by others.

Figure 5:
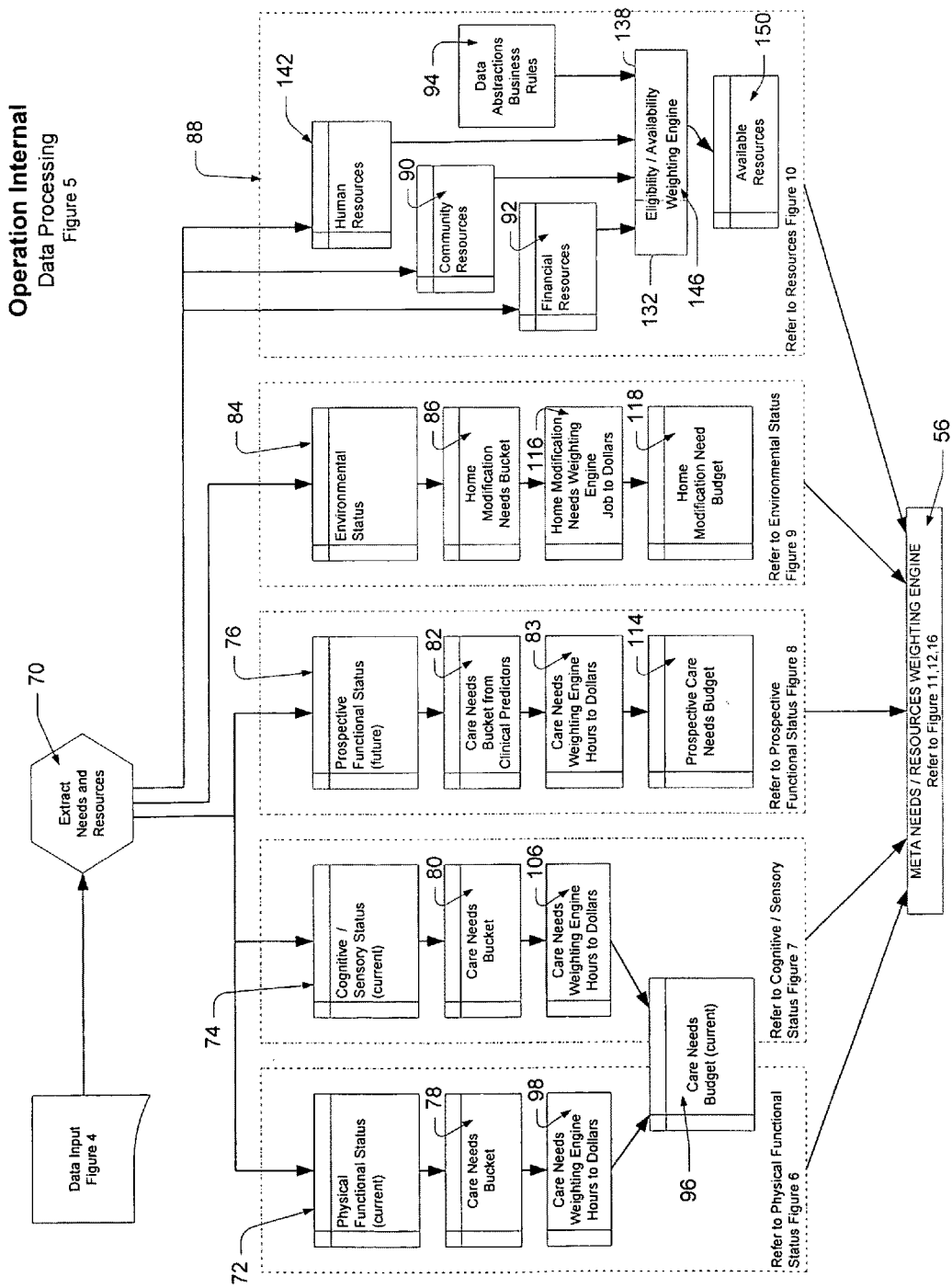
FIG. 5 is a schematic representation of the data processing components of the internal operation of the CFCP information exchange system.

FIG. 5 illustrates the data processing components of the internal operation of the system processor 36 of the CFCP information exchange system 10, as shown in FIGS. 1 and 2, in accordance with the preferred embodiment of the present invention. Upon receipt of inputted care-receiver data 13, the CFCP system 10 extracts needs and resources 70 to appropriate data analysis and processing components of the system processor 36. The CFCP system 10 generally provides an integrated, data-based system that organizes critical categories of individual, unique information associated with the client's current physical functional status 72, current cognitive and sensory functional status 74, prospective functional status (physical, cognitive and sensory) 76 as determined by clinical predictor variables, living environmental status abstractions 84, and long term care resource abstractions 88. The CFCP system 10 calculates cumulative care-needs (or lack thereof) for the critical categories of current physical deficits/abilities 72, current cognitive/sensory deficits/abilities 74, and prospective functional deficits/abilities 76. The CFCP system 10 then risk-adjusts the current physical 72, sensory/cognitive 74, and prospective 76 functional status variables, and weights them in terms of the amount, type and cost of care the client may need to remain safe in a community setting or other long-term care setting. At the same time, the CFCP system organizes individual, unique information associated with the client's living environment status variables 84, including accessibility variables relative to mobility and sensory impairments. The CFCP system 10 then calculates cumulative home-modification needs 86. The CFCP system 10 then risk-adjusts the home-modification needs 86 and environmental status variables 84 and weights them in terms of the amount, type and cost of modifications the client may need to remain safe in a community setting or other long-term care setting. At the same time, the CFCP system organizes individual, unique information regarding the client's long-term care resources status 88, including human resources (financial and in-kind services from family, friends and neighbors), local, state or federal community and/or institutional resources 90 (relevant to client's age, marital status, town/city, county, state or country of residence), and personal financial resources 92 (fixed and non-fixed income, liquid and non-liquid assets, and so on). Immediate and prospective availability of resources from human, community and financial sources are weighted and calculated as to immediate or prospective availability as determined by operating rules derived from data abstractions for selecting and evaluating the described status variables. The CFCP system 10 then organizes and calculates the sum of actual or potential resources derived from family and friend contributions (human resources) 142, personal finances 92, and community resources 90.

Figure 6:
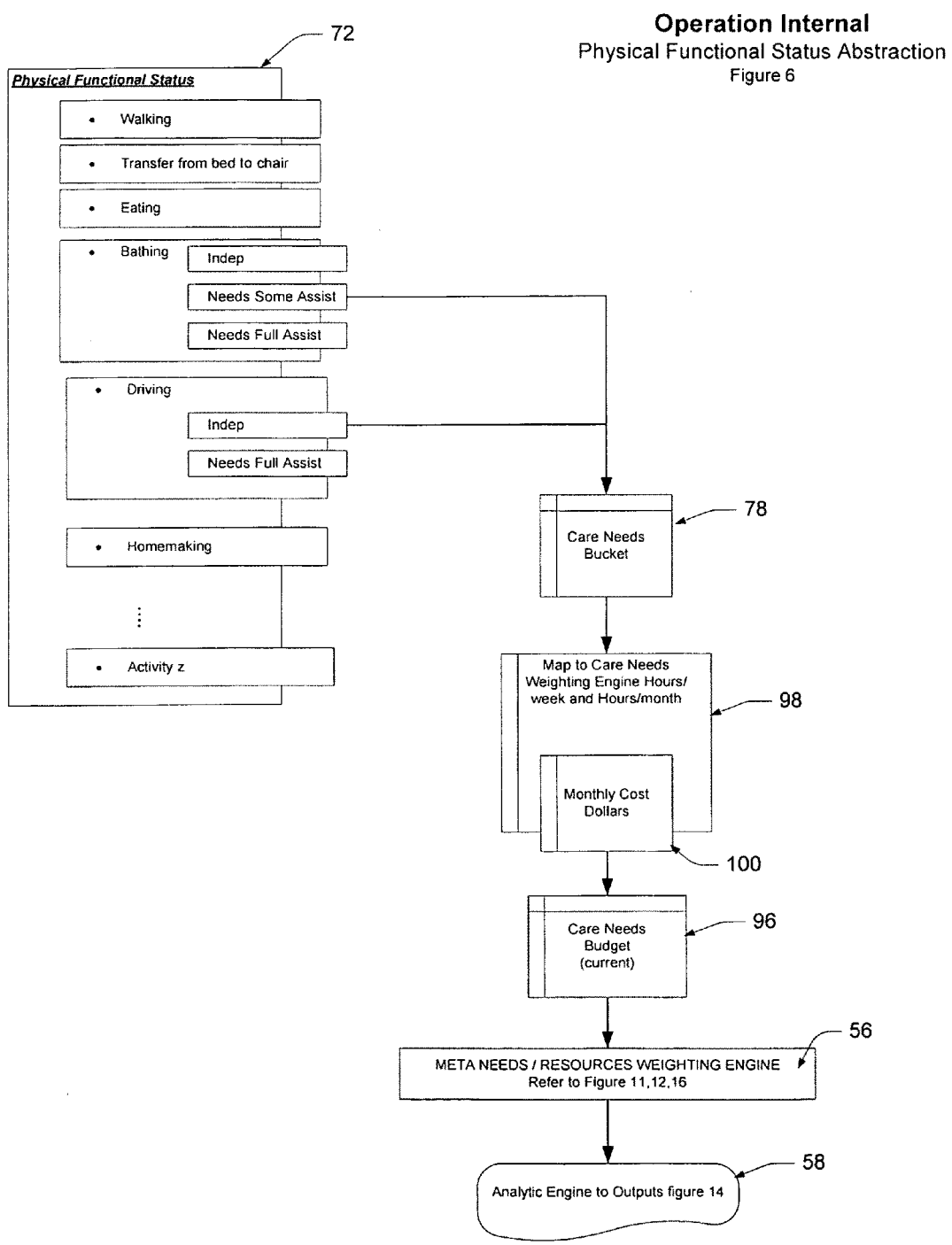
FIG. 6 is a schematic representation of the detailed data processing of the client's physical functional status abstractions (internal operation) for the CFCP information exchange system.

FIG. 6 illustrates detailed data processing of the selected data regarding the client's current physical functional status abstractions 72 (internal operation) described with reference to FIG. 5 by data abstraction processing means 24 of the system processor means for the CFCP information exchange system 10, as shown in FIG. 1, in accordance with the preferred embodiment of the present invention. Current physical functional status variables 72, including activities of daily living (ADLs), such as walking, dressing, transferring from bed to chair, eating, bathing, toileting) and instrumental activities of daily living (IADLs), such as driving, shopping, cleaning, laundering, bill paying, and so on, are evaluated as to client's abilities and deficits. Deficits are accumulated in the Care Needs Bucket 78, evaluated and weighted in the Care Needs Weighting Engine 98 as to the hours per week and/or hours per month of care that is required to maintain client safety and stability in home or community-based or other long-term care setting. A monthly cost-of-care amount 100 associated with current physical functional deficits is then estimated and recorded in the current care needs budget 96. This measure is recorded in the Meta Needs/Resources Weighting Engine 56 for processing to the Analytic Engine 58 as the report generating output means 58 for producing as an output the care plan options report 26.

Figure 7:
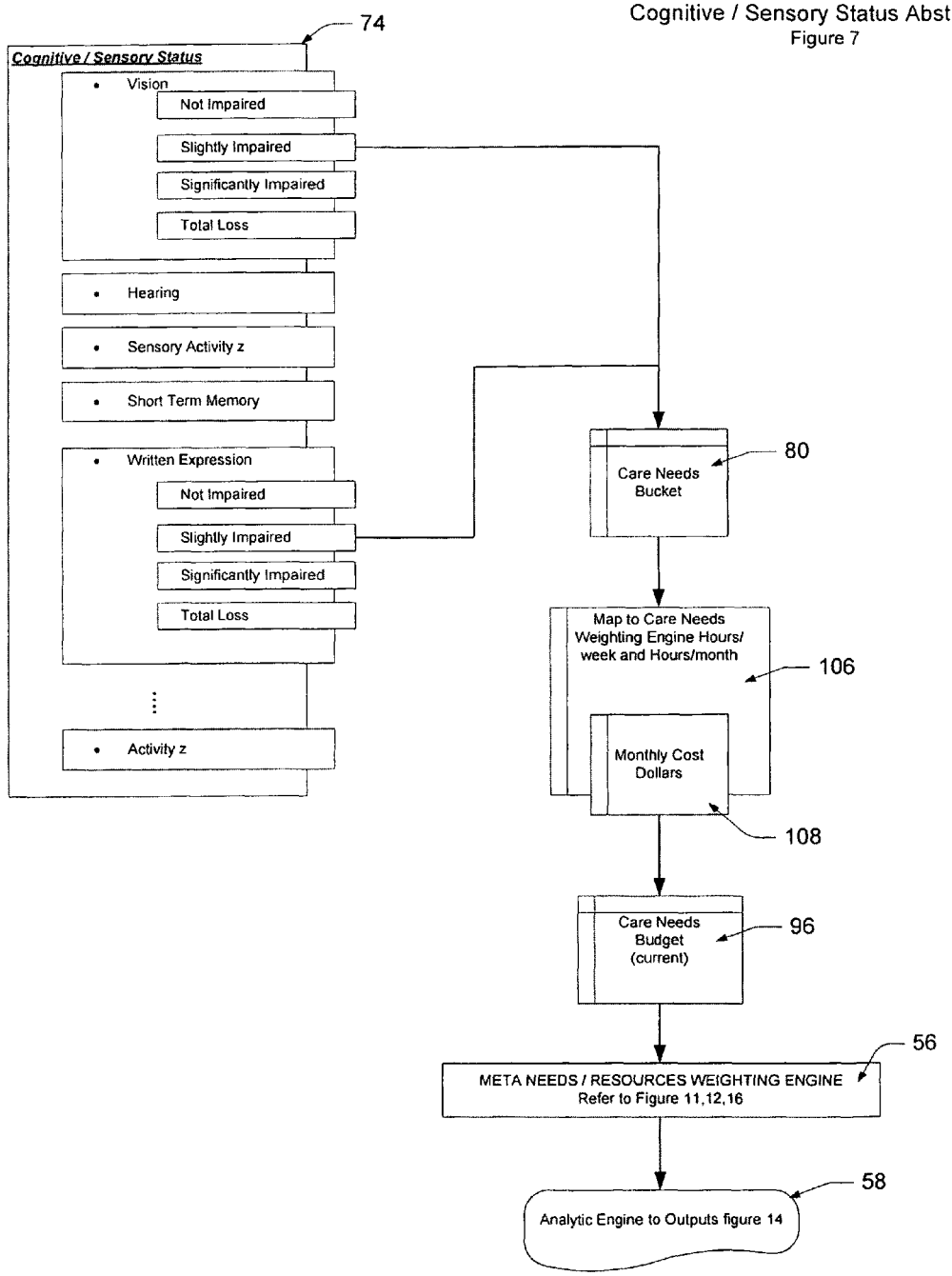
FIG. 7 is a schematic representation of the detailed data processing of the client's cognitive and sensory status abstractions (internal operation) for the CFCP information exchange system.

FIG. 7 illustrates detailed data processing of the selected data regarding cognitive and sensory status abstractions 74 (internal operation) described with reference to FIG. 5 by data abstraction processing means 24 of the system processor means 36 for the CFCP information exchange system 10, as shown in FIG. 1, in accordance with the preferred embodiment of the present invention. Current cognitive and sensory status variables 74, including vision, hearing, sense of smell, memory, orientation, ability to communicate, and so on, are evaluated as to client's abilities and deficits. Deficits are accumulated in the Care Needs Bucket 80, evaluated and weighted in the Care Needs Weighting Engine 106 as to the hours per week and/or hours per month of care that is required to maintain client safety and stability in home or community-based or other long-term care setting. A monthly cost-of-care amount 108 associated with current cognitive and sensory deficits is then estimated and recorded in the current care needs budget 96. This measure is recorded in the Meta Needs/Resources Weighting Engine 56 for processing to the Analytic Engine 58 as the report generating output means 58 for producing as an output the care plan options report 26.

Figure 8:
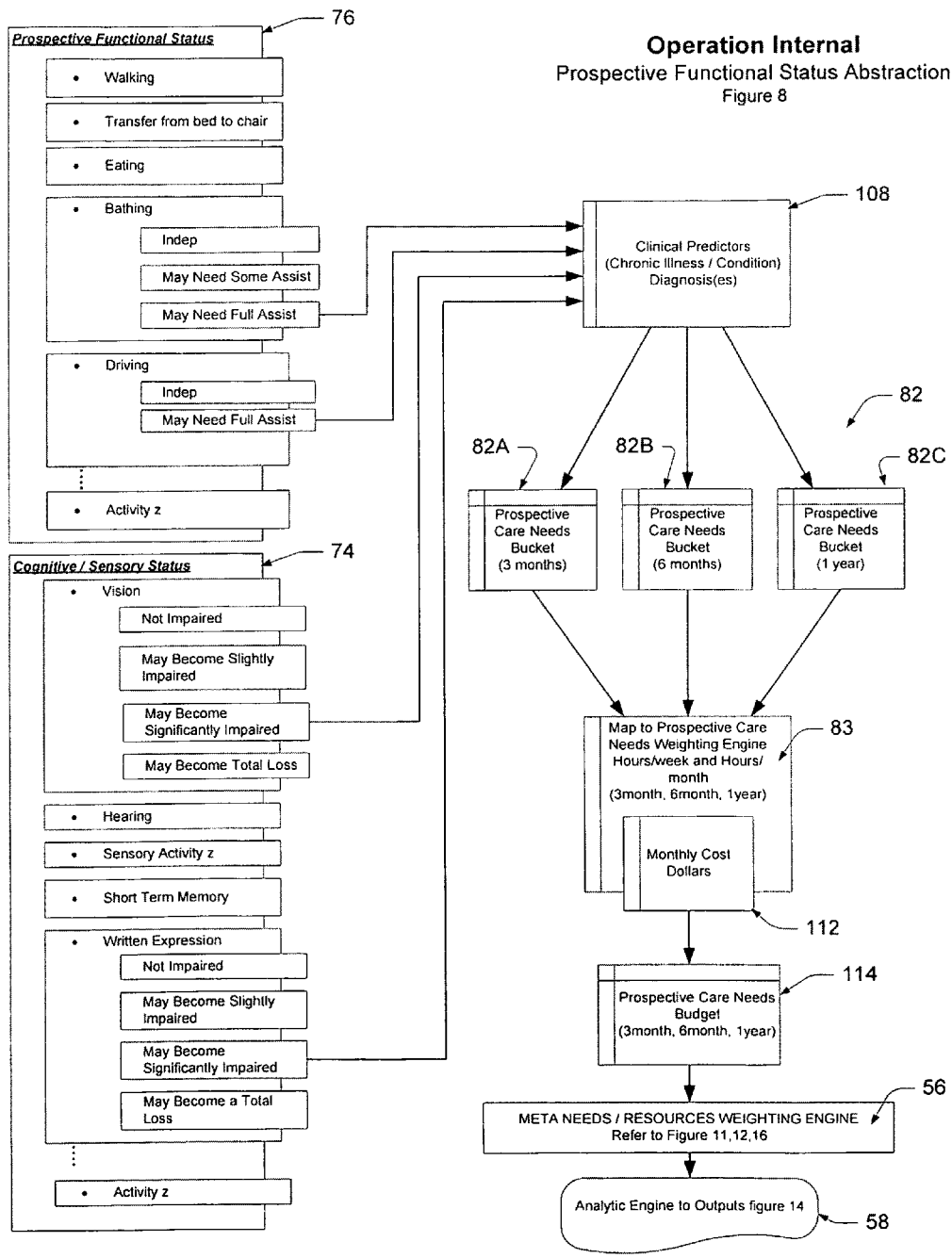
FIG. 8 is a schematic representation of the detailed data processing of the client's prospective functional status abstractions (internal operation) for the CFCP information exchange system.

FIG. 8 illustrates the detailed data processing of the selected data regarding the client's prospective functional status abstractions 76 (internal operation) described with respect to FIG. 5 by the data abstraction processing means 24 of the system processor 36 for the CFCP information exchange system 10, as shown in FIG. 1, in accordance with the preferred embodiment of the present invention. The client's prospective physical abilities and deficits, including ADLs ("Activities of Daily Living", including primarily bathing, dressing, toileting, eating, ambulation and transfers) and IADLs ("Instrumental Activities of Daily Living, including but not limited to shopping, cleaning, laundry, bill paying, telephone use, arranging transportation and so on), as well as prospective cognitive and sensory status variables, including vision, hearing, memory, expression, and so on 74 are evaluated as to clinical predictors 108 based on existing chronic illness and/or condition diagnosis(es). Prospective deficits are accumulated in the Prospective Care Needs Bucket 82 evaluated and weighted in the Prospective Care Needs Weighting Engine 83 as to a probable hours per week and/or hours per month of care that will be required to maintain client safety and stability in home or community-based or other long-term care setting over the ensuing 3 month 82A, six month 82B and 1 year 82C time frames. A monthly cost-of-care 112 associated with prospective functional deficits is then estimated and recorded in the prospective care needs budget 114 for 3 month, six month and 1 year projections. These measures are recorded in the Meta Needs/Resources Weighting Engine 56 for processing to the Analytic Engine 58 as the report generating output means for producing as an output the care plan options report 26.

Figure 9:
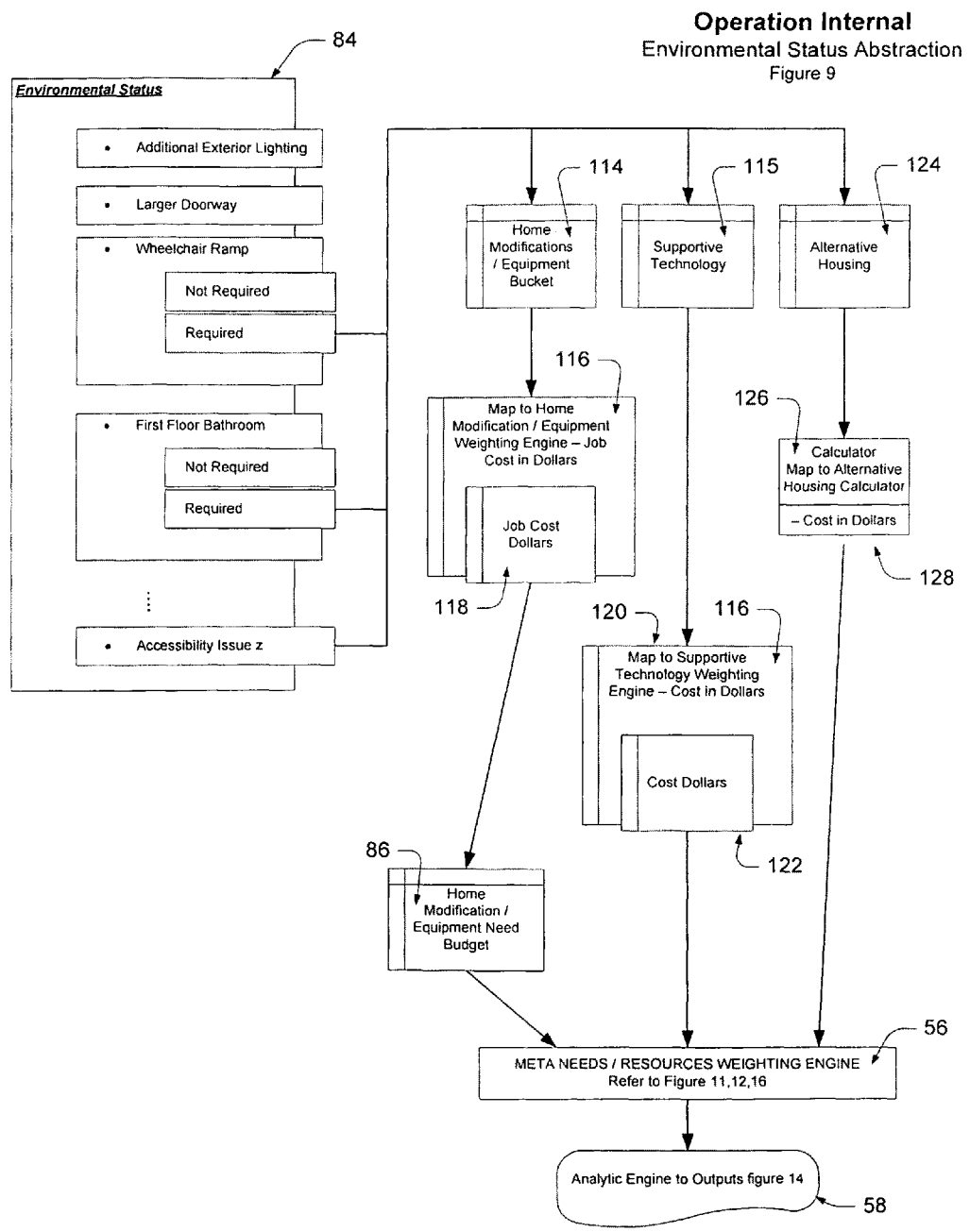
FIG. 9 is a schematic representation of the detailed data processing of the client's living environment status abstractions (internal operation) for the CFCP information exchange system.

FIG. 9 illustrates the detailed data processing of the selected care receiver data regarding the client's living environment status abstractions 84 (internal operation) described with respect to FIG. 5 by data abstraction processing means 24 of the system processor means 36 for the CFCP information exchange system 10, as shown in FIG. 1, in accordance with the preferred embodiment of the present invention. Current living environment status variables 84, including exterior lighting, accessibility of doorways, accessibility of living space, accessibility of living space from outside, and so on, are evaluated as to client's abilities and deficits. Home modification and equipment needs 114 that can overcome accessibility and/or "home-performance" problems are accumulated in the Care Needs Bucket 86, evaluated and weighted in the Home Modification/Durable Medical Equipment Needs Weighting Engine 116 as to the job and equipment costs associated with maintaining client safety and stability in home or community-based or other long-term care setting. A home modification and equipment budget amount 118 is then estimated and recorded.

At the same time, supportive technology needs that can overcome accessibility and/or "home-performance" problems are accumulated in the Supportive Technology Needs Bucket 115, evaluated and weighted in the Supportive Technology Needs Weighting Engine 120 as to the technology support equipment costs associated with maintaining client safety and stability in home or community-based or other long-term care setting. An assistive technology equipment budget amount 122 is then estimated and recorded.

At the same time, alternative housing options that can overcome accessibility an/or "home-performance" problems are accumulated in the Alternative Housing Arrangements Bucket 124, evaluated and weighted in the Alternative Housing Weighting Engine 126 as to the alternative housing costs associated with maintaining client safety and stability in home or community-based or other long-term care setting. An alternative housing budget amount 128 is then estimated and recorded.

All of the above measures, including home modification and durable medical equipment needs 118, assistive technology needs 122, and alternative housing options 128 are recorded in the Meta Needs/Resources Weighting Engine 56 for processing to the Analytic Engine 58 as the report generating output means 58 for producing as an output the care plan options report 26.

Figure 10:
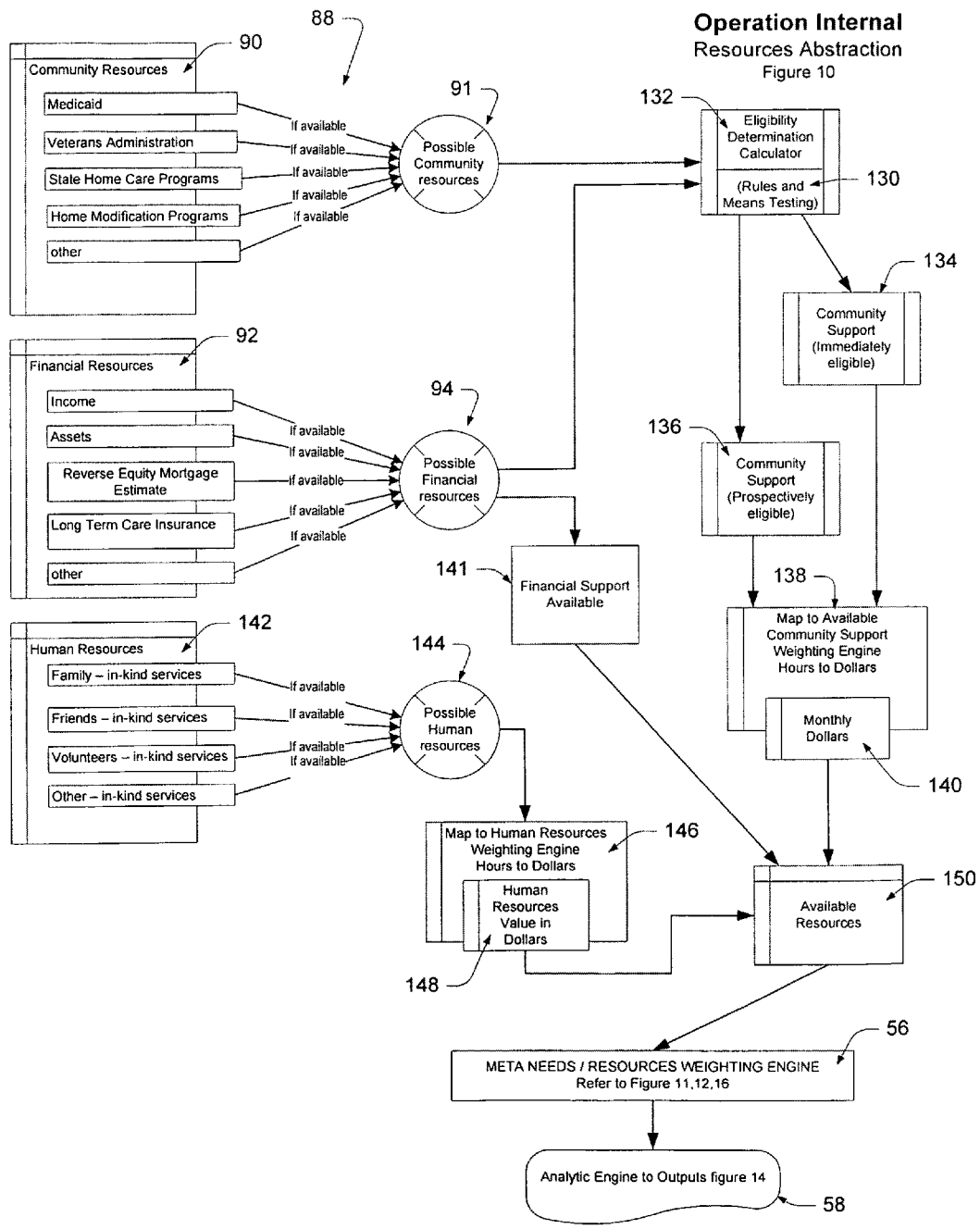
FIG. 10 is a schematic representation of the detailed data processing of the client's long-term care resource abstractions (internal operation) for the CFCP information exchange system.

FIG. 10 illustrates the detailed data processing of the selected care-receiver data regarding long-term care resource data abstractions 88 (internal operation) described with respect to FIG. 5 by data abstraction processing means 24 of the system processor means 36 for the CFCP information exchange system 10, as shown in FIG. 1, in accordance with the preferred embodiment of the present invention. Community and institution resources 90, such as Medicaid, Veterans' benefits, state home care programs, home modification loan programs, and other community and institution programs are pooled from the high-level data abstractions 88 as possible community and institution resources 91. Based on operating rules and pre-determined means testing rules 130, the eligibility determination calculator 132 determines the client's immediate 134 or prospective 136 eligibility for community and institution resources and programs 90. Community programs 90 are evaluated and weighted in the Available Community Support Weighting Engine 138 as to an hours and dollar-equivalent value 140 of the available monthly services.

At the same time, the client's financial resources 92, including income, assets, reverse equity mortgage estimate, long-term care insurance, family financial contributions, and other financial resources are pooled as possible financial resources 94 and calculated as a financial support available value 141. At the same time, human resources 142, such as in-kind services from family, friends and volunteers, as well as other in-kind services are pooled as possible human resources 144. Human resources are evaluated and weighted in the Available Human Resources Weighting Engine 146 as to the hours and dollar-equivalent value 148 of the available monthly services.

All of the above resource measures 150, including available community and institution support resources 140, available financial resources 141, and available human resources 148, are recorded in the Meta Needs/Resources Weighting Engine 56 for processing to the Analytic Engine 58 as the output report generating means 58 for producing as an output the care plan options report 26.

Figure 11:
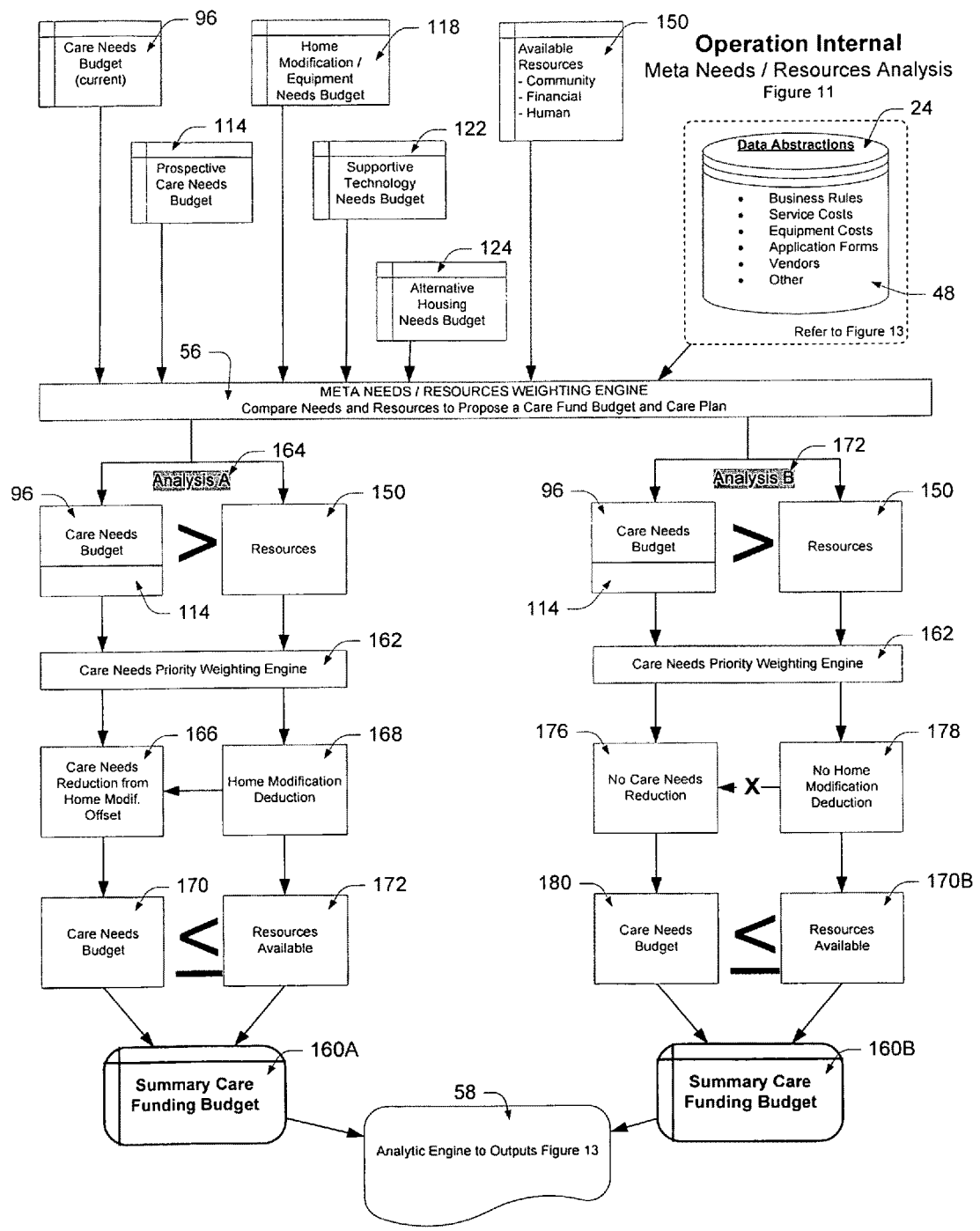
FIG. 11 is a schematic representation of the Meta Needs/Resources Weighting Engine (internal operation), Analysis A and Analysis B for the information exchange system.
Figure 12:
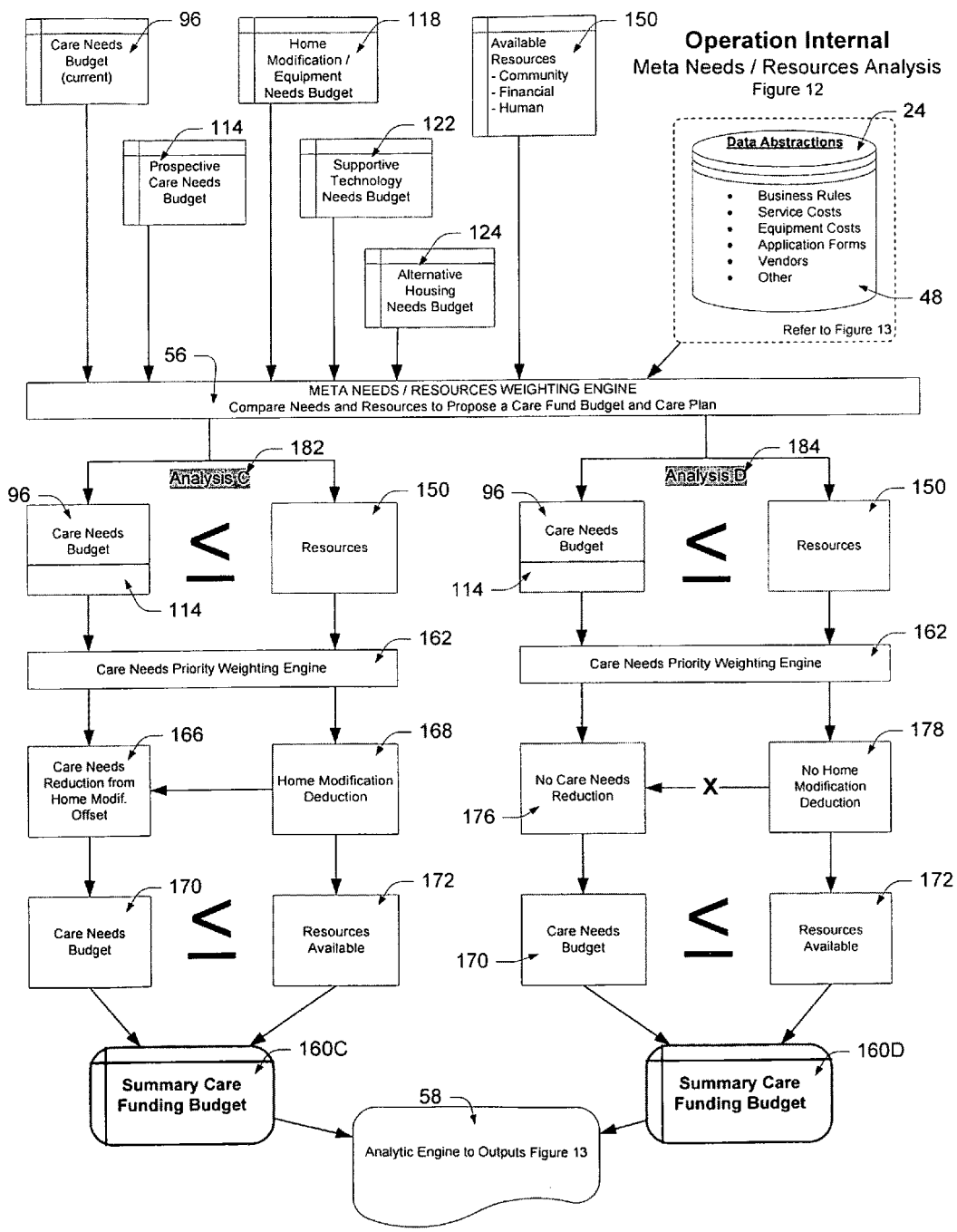
FIG. 12 is a schematic representation of the Meta Needs/Resources Weighting Engine (internal operation), Analysis C and Analysis D for the CFCP information exchange system.

FIGS. 11, 12 and 16 illustrate the Meta Needs/Resources Weighting Engine means (MNRWE) 56 of the internal operation of the system processor means 36 the CFCP information exchange system 10, as shown in FIG. 1, in accordance with the preferred embodiment of the present invention. The MNRWE 56 allocates, analyzes and cross references weighted resource allocations 150 with weighted care needs budgets 96, 114, 122, 124 described above to calculate a care funding budget 160A, 160B, 160C, 160D. Risk-adjusted weights for these offsetting variables are cross calculated to arrive at a sum or measure of the amount, cost and type of care the client may need to remain safe in a community setting or other long-term care setting, and to arrive at a sum or measure of the differential amount, cost and type of care the client may need with and without the environmental modifications completed. As an example of the above, the MNRWE performs four analyses, depending on the availability of resources as cross referenced to care needs. The MNRWE receives budgeting information that results from the above described selection and evaluation by the data abstraction processing means 24 of the care receiver data 13 within the system processor 36. The abstracted budget information includes the current care needs budget 96, the prospective care needs budget 114, the home modification budget and durable medical equipment budget 118, the supportive technology budget 122, and the alternative housing budget 124. The MNRWE also receives information that results from the above described selection and evaluation by the data abstraction processing means 24 of the cumulative available resources 150 from all categories, including community/institutional 140, financial 141, and human 148 resource values.

FIG. 11 illustrates the MNRWE function when care needs budgets 78, 114, 118, 122 and 124 exceed available resources 150. The MNRWE assigns priority weights 162 to current care needs 78 and prospective care needs 114. In Analysis A 164, home modification-equipment-technology costs 118 are deducted from resources 150. The modification/equipment/technology acquisitions have the effect of reducing the need for certain types of care. The prospective care needs budget 114 is commensurately reduced 166 by the home modification-equipment-technology offset 168 to establish a summary priority care needs budget 170 that is equal to or less than the summary resources available 172 resulting in a first summary care funding budget 160A. In Analysis B 172, home modification, equipment, technology costs 118 are not deducted 176 from resources 150, as either the modification-equipment-technology acquisitions costs do not have the effect of reducing the need for certain types of care, or there are no home modification needs 178. The priority care needs budget remains intact 180 to thereby establish an Analysis B 172 summary priority care needs budget 180 that is equal to or less than the summary resources available 170B, resulting in a second summary care funding budget 160B. The summary budget data 160A or 160B are then referred to the Analytic Engine 58 as the output report generating means for producing as an output the care plan options report 26.

FIG. 12 illustrates the MNRWE function when care needs budgets 96, 114, 118, 122, and 124 are equal to or less than available resources 150. In Analysis C 182, home modification/equipment/technology costs 168 are deducted from resources 150. The modification-equipment-technology acquisitions have the effect of reducing the need for certain types of care. The care needs budget 166 is commensurately reduced by the home modification-equipment-technology offset 168 to establish a summary care needs budget 170 that is equal to or less than the summary resources available 172, resulting in a third summary care funding budget 160C. In Analysis D 184, home modification-equipment-technology costs 178 are not deducted from resources 176, as either the modification-equipment-technology acquisitions do not have the effect of reducing the need for certain types of care, or there are no home modification needs. The care needs budget 170 remains intact so that it is equal to or less than the summary resources available 172, resulting in a fourth summary care funding budget 160D. Summary budget data 160C or 160D are then referred to the Analytic Engine 58 as the output report generating means for producing as an output the care plan options report 26.

Figure 13:
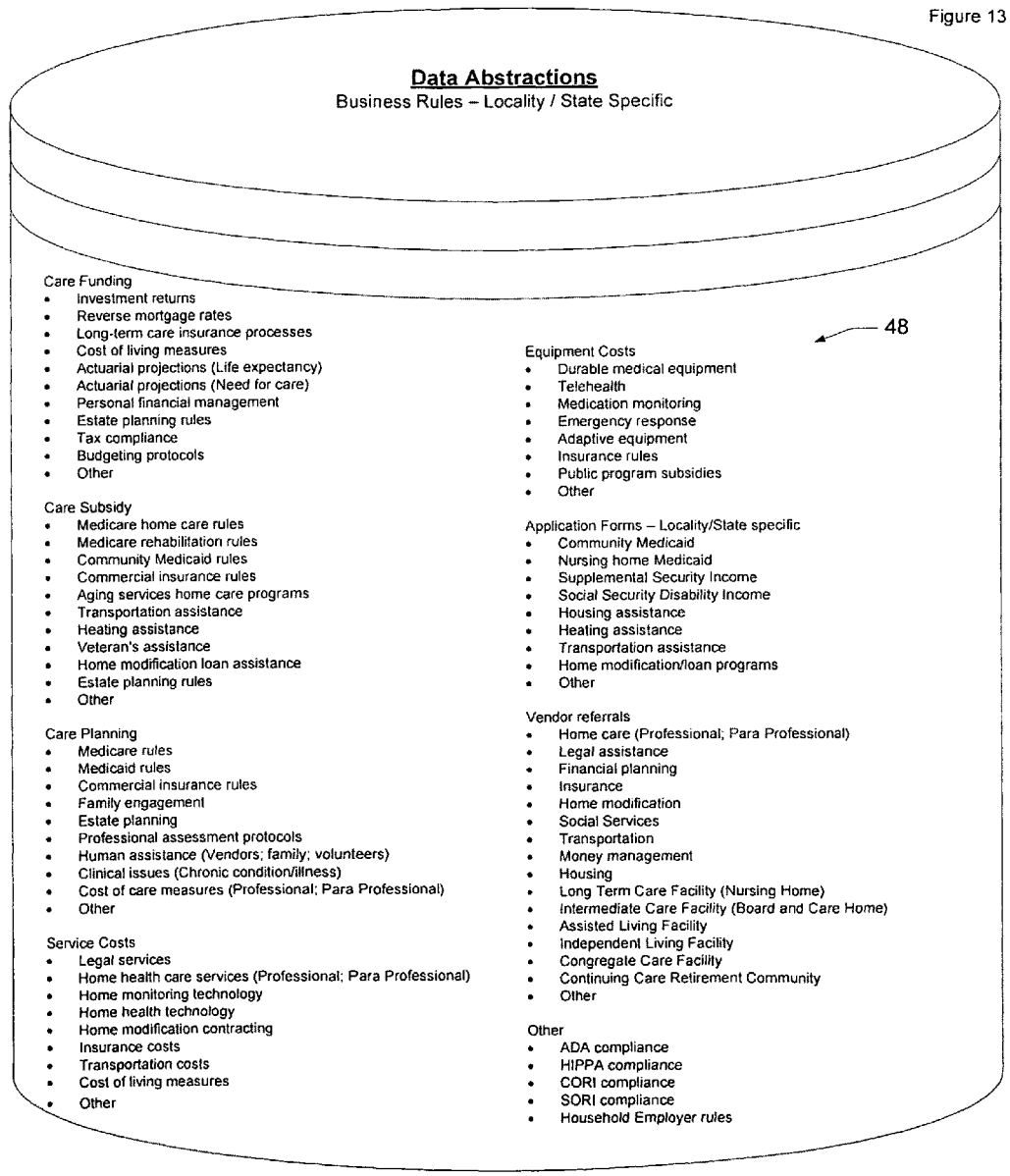
FIG. 13 is a schematic representation of the high-level data abstractions (internal operation) for the CFCP information exchange system.

FIG. 13 shows schematically data base means 48 (internal operation) for the system processor 36 CFCP information exchange system 10, as shown in FIG. 1, in accordance with the preferred embodiment of the present invention. The data base information and integrated business operating rules 48 stored in the CFCP system as data base means 48 for selectively allocating values to care-receiver data abstractions described above are maintained up to date because a system administrator (not shown) substantially, immediately and in real time uploads any changes in the community resource eligibility rules, estate planning rules, cost-of-care averages, reverse mortgage rate averages, investment return averages, and other measures and rules, without limitation, to the data-base management system. The data base 48 information includes, without limitation, care funding and care plan options derived from human assistance, home modifications, durable medical equipment, supportive technology, care subsidy plans, care funding plans, automated forms for various community programs, including but not limited to Medicaid, heating assistance, home modification loan programs, transportation assistance, and so on, vendor referrals, home care cost calculations, financial resource calculations, including, but not limited to reverse equity mortgage calculations, investment calculations, long-term care insurance calculations, and additional state-specific business rules associated with the long-term care of physically- and cognitively-disabled individuals, the chronically-ill and/or frail-elderly individuals, and similar information now known in the art or that becomes known in the art described above.

FIG. 16 illustrates the MNRWE function when care needs budgets 96, 114, 118, 122 and 124 are greater than available resources 150. In Analysis E 210, home modification-equipment-technology costs 212 are deducted from resources 150. The modification-equipment-technology acquisitions have the effect of reducing the need for certain types of care. The care needs budget 214 is commensurately reduced by the home modification-equipment-technology offset 216, however the summary care needs budget 170 remains greater than the summary resources available 172, resulting in a fifth summary care funding budget 160E. In Analysis F 218, home modification-equipment-technology costs 220 are not deducted from resources 222, as either the modification-equipment-technology acquisitions do not have the effect of reducing the need for certain types of care, or there are no home modification needs. The care needs budget 170 remains intact so that it remains greater than the summary resources available 172, resulting in a sixth summary care funding budget 160F. Summary budget data 160E or 160F are then referred to the Analytic Engine 58 as the output report generating means 58 for producing as an output the care plan options report 26.

Figure 14:
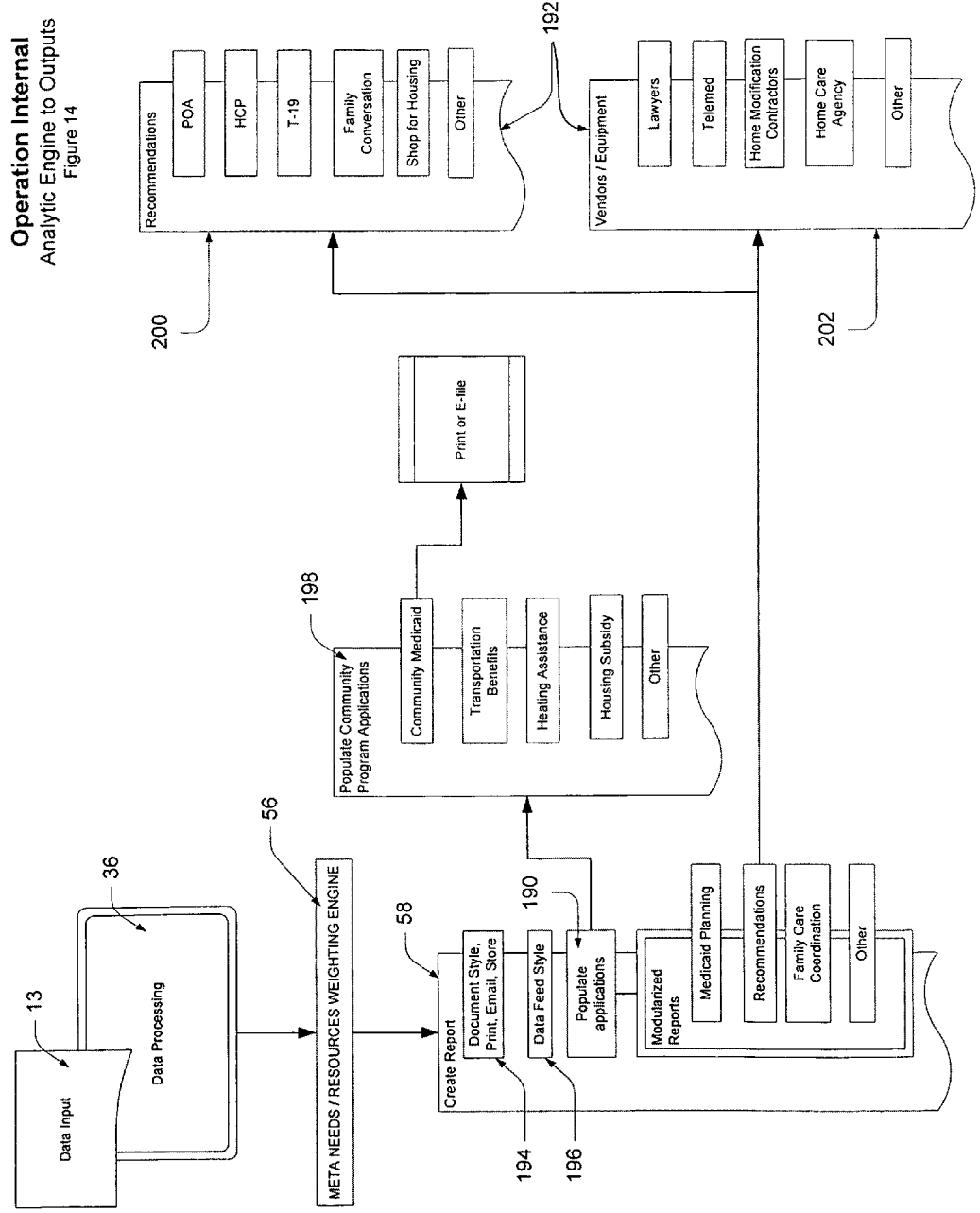
FIG. 14 is a schematic representation of the Analytic Engine to Outputs (internal operation) for the CFCP information exchange system.

FIG. 14 illustrates the analytic engine to outputs 58 as a report generating means 58 (internal operation) of the system processor 36 of the CFCP information exchange system 10, as shown in FIG. 3, in accordance with the preferred embodiment of the present invention. Summary care-funding budgets 160A, 160B, 160C, 160D, 160E, 160F developed by the meta needs/resources weighting engine 56 are directed into tables and text 190 within the analytic engine 58 to create as a report generating means 58 output a Care-Funding and Care-Planning options report 192. Documents are styled to accommodate individual user's browsers 194 for either print, email or storage. Internal data feeds 196 from the internal CFCP data base means 48 enable automatic preparation of relevant community resource applications 198 that include, without limitation, Medicaid, Social Security Disability, housing assistance, heating assistance, transportation assistance, and other programs. Options within the care plan option report 192 of FIG. 14 may be purveyed and generated in modularized format that preferably includes the following modules:

1. Care Budget—Provides a series of tables with calculations indicating the type and amount of care needed by the client (or "care receiver"), the cost of the care, and the resources available to meet the care needs. Includes individualized cost-of-living budgets that also calculate prevention-care affordability.

2. Clinical Report—Provides individualized recommendations as to the type and amount of preventive-care services that may be needed, that may include homemaking, personal care assistance, professional care oversight, and counseling. Also provides a brief description of the chronic illness(es) and condition(s) of the care receiver.

3. Medicaid Report—Provides a detailed description of Medicaid eligibility rules and benefits, as well as individual, state-specific planning steps that facilitate access to community Medicaid.

4. Family Caregiver Report—Shares information relevant to care planning with the client's family caregivers. Provides family care-coordination advisories in four specific areas, including the importance of advance directives, financial planning, housing alternatives, and family task sharing.

5. Financial Planning Report—Provides brief overview of client's financial status; clarifies state-specific resource-development options that may include the use of reverse equity mortgages to pay for care; offers information about financial planning re: investment options, loan information, insurance analysis, and so on.

6. Estate Planning Report—Provides information about relevant estate planning concerns, including advance directives and asset transfers as they impact long-term care planning.

7. Community Support Advisory—Provides information regarding various community support programs for which care receiver may be eligible, including VA benefits, aging services, heating assistance, transportation, delivered meals, home care, advocacy, and so on. Offers referrals for local assistance from professional, para-professional and non-medical caregivers, as well as from resource-management specialists, including estate-planning attorneys, financial planners, accountants, and insurance professionals.

8. Institutional Support Advisory—Provides information regarding various institutional support programs for which care receiver may be eligible, including nursing home benefits, intermediate care facility benefits, assisted living facility benefits, independent living facility benefits, VA benefits, aging services, advocacy, and so on. Offers referrals for local assistance from professional, para-professional and non-medical caregivers, as well as from resource-management specialists, including estate-planning attorneys, financial planners, accountants, and insurance professionals.

9. Housing Report—Provides information regarding environmental barrier modifications that improve accessibility and reduce risk for illness and injury. Offers information about financing accessibility modifications, housing subsidies, and housing alternatives for elders and people with disabilities.

Reports are also available in summary format 200, 202 and that include, without limitation, vendor referrals for legal assistance, technology supports, home care, institution care home modification contractors, social services, insurance referrals, financial-planning referrals, community support programs, institution support program and other relevant referrals and vendors.

Figure 15:
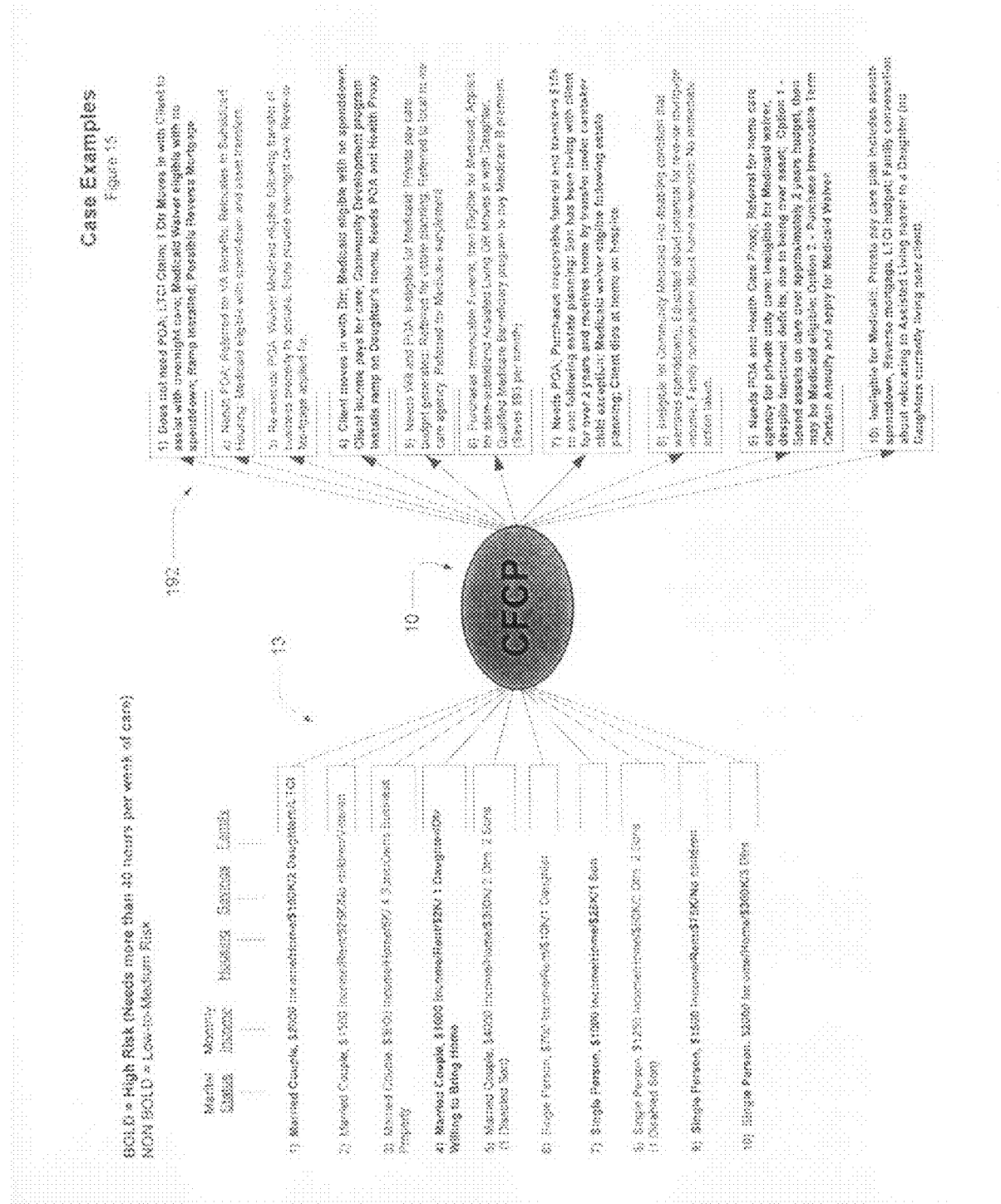
FIG. 15 is a schematic representation of the ability of the CFCP to generate unique and individualized care-funding and care-planning options reports for the diverse population of chronically ill, disabled, or frail elderly long-term care consumers by passing them through a single CFCP information exchange system.

FIG. 15 illustrates the ability of the CFCP to generate unique and individualized care-funding and care-planning options reports for a diverse population of chronically ill, disabled, or frail elderly long-term care consumers by passing their respective care-receiver data 13 through the CFCP information exchange system 10 to produce various care-receiver specific care plan options reports 192.

FIGS. 17A-17F illustrate a completed sample data input map 16 for the CFCP information exchange system 10, as shown in FIG. 1. Data entry pages are dynamically determined and presented based on plan selection by subscriber/user who completes plans determined by recipient of care's age, marital status and zip code indicating both locality, region and state of residence.

EXAMPLE A below illustrates an example of a CFCP system 10 generated care plan options report 192 that is unique and individualized for the sample client as described in the Summary of the Invention section above, and that is generated by the CFCP information exchange system 10. All resource and care need calculations, cost-of-home-modification calculations, technology-support costs, resource-development options, family-care contributions (both in-kind and financial), alternative-housing budgets, and community-program and institution-program eligibility calculations are featured in tables rendered in the care-funding and care-planning options report. The resulting document is based on the care recipient's data, and provides planning and option information for consideration on how to best meet the needs of the care recipient. Options presented range from how to allocate family resources for day to day tasks, to itemized options for financial and legal planning, and how to become eligible for community support programs that the recipient may be entitled to.

The CFCP system 10 compiles the care-receiver data 13 as described above using server side scripts and applies a number of metrics and analytics to generate a Care-Funding and Care-Planning Options Report 192 in either rich text or Portable Document Format (PDF) format. Furthermore the recipient's needs are weighted and service estimates calculated and matched up with service providers that CFCP refers to. Referrals are by location and web links to those partners embedded into the Care-Funding and Care-Planning Options Report as suggested referrals. Referral can be bi-directional in nature (example, while using the CFCP software for estate planning, a Law office may discover a need and refer services to a home health care provider). CFCP Care-Funding and Care-Planning Options Reports are compliant with the Americans with Disability ACT (ADA) when viewed with a PDF reader. CFCP system is fully Web compliant with ADA.

Start of Example A

Careplan Options Report

Re: Care Planning for Bernice
Date: Feb. 24, 2007

This Care Plan Options Report will help Bernice, Wilbur and their family with decisions about Bernice's care. It will also help them find the resources available to meet Bernice's care needs, to understand the types of care available in different settings, and to meet the costs associated with that care. In this care plan, Bernice is the client. Wilbur's care needs are not addressed in this report.

This report includes both general and specific care planning information. It does not make medical diagnoses or recommendations about medical treatment. Bernice and Wilbur should review this report with Bernice's health care and social service professionals before initiating a care plan or residential placement option. The eligibility rules indicated in the following report, although current at the time this report was written, are subject to change. Prior to initiating any financial- or estate-planning activities, Bernice, Wilbur and their family should consult with an attorney, financial planner or care manager who is familiar with these rules.

BERNICE'S CARE RESOURCES: This table estimates the resources that are both immediately available and potentially available to Bernice to meet her care needs. We have included an estimate of Bernice's own resources, in-kind assistance her family can offer, and support that may be available from her community. The report that follows shows how some or all of these resources may be developed to help Bernice and Wilbur.

| Resource | Description | Est. Monthly Care Resource |
|---|---|---|
| Fixed Income (Couple) | 2200 p/mo Fixed Income | $140 (Income Less Expenses) |
| Assets | $59,000 available liquid assets | $245.83 (@5% P/Mo)* |
| Long-Term Care Insurance | NONE | 00 |
| Home Equity | $200,000 in home equity | $940 (Rev. Mtg.)* |
| Family | Spouse; 2 Dtrs.—Hours Available p/mo—168 | $3360 (In-Kind Svcs) |
| Community | Possible Medicaid Waiver; | $3000 |
| Programs | Home Care Program; VA Benefits | |
| Total LTC Resources | | $7685.83 |

BERNICE'S ESTIMATED COST OF CARE: Based on your responses, this table estimates the type of care Bernice may need, the number of hours per month, and the possible cost. The report that follows shows how some or all of the costs may be met by community programs, by insurance, or by Bernice's (and her family's or her friends') own resources.

| Functional Task | Indep. | Needs Some Assist (Est. Monthly Hours) | Needs Full Assist (Est. Monthly Hours) | Estimated Monthly Cost |
|---|---|---|---|---|
| Bathing | | | 12.60 | $264.60 |
| Dressing | | 12.60 | | $264.60 |
| Toileting | ✓ | | | |
| Walking | ✓ | | | |
| Transfers (Bed to Chair/vice-versa) | ✓ | | | |
| Eating | ✓ | | | |
| Driving | | | 16.80 | $285.60 |
| Meal Preparation | ✓ | | | |
| Shopping | | | 12.60 | $214.20 |
| Cleaning | | | 12.60 | $214.20 |
| Laundry | | | 12.60 | $214.20 |
| Making Appointments | ✓ | | | |
| Arranging Transportation | ✓ | | | |
| Wilbur Paying | ✓ | | | |
| Overnight assistance | ✓ | | | |
| Total | | 12.60 | 67.20 | $1457.40 |

BERNICE'S FUNCTIONAL STATUS: Bernice uses a walker part time. She uses a cane part time. She does not use a wheelchair. Bernice's vision is slightly impaired. Bernice's hearing is slightly impaired. Her sense of touch in her upper extremities is slightly impaired. Her sense of touch in her lower extremities is slightly impaired. She easily expresses herself. She has no difficulty writing. Bernice has difficulty understanding and following instructions some of the time. She is a good reporter some of the time. Bernice is alert most of the time. She is confused some of the time. Bernice recognizes her family and friends. She knows where she is. She knows what time it is, knows the date, knows the season and knows what year it is. Her short-term memory is significantly impaired and her long-term memory is slightly impaired.

CLINICAL ADVISORY: This report does not make medical diagnoses or recommendations about medical treatment. Bernice and Wibur should review this report with Bernice's physician or care manager before initiating a care plan or residential placement option.

BERNICE'S POTENTIAL CARE BUDGET: With some planning, some assistance from their family, and some help from their community, Bernice and Wilbur may be able to develop an estimated surplus of $6228.43 per month in home care resources. The details of their care plan options are clarified in the report that follows.

| Resource | Est. Monthly Care Resource |
| --- | --- |
| Total LTC Resources | $7685.83 |
| Less Est. Care Budget | −$1457.40 |
| Resource Surplus Resource (Deficit) | $6228.43 SURPLUS |

BERNICE'S PROSPECTIVE CARENEEDS BUDGETS: Bernice currently needs 79.8 hours per month of homemaking, supervision and personal care assistance. Bernice has Congestive Heart Failure, Multiple Sclerosis and Osteoporosis. Bernice's chronic conditions are progressive, and are likely to lead to increased need for care in the near future. Bernice, Wilbur and their family should plan for the possibility that Bernice's could need 24-hour-per-day supervision, companionship, homemaking and personal care. The following projected budgets may develop over time.

Three Months

| Resource | Est. Monthly Care Resource |
| --- | --- |
| Total LTC Resources | $7685.83 |
| Less Est. Care Budget (160 hours p/mo) | −$3000.00 |
| Resource Surplus Resource (Deficit) | $4685.83 SURPLUS |

Six Months

| Resource | Est. Monthly Care Resource |
| --- | --- |
| Total LTC Resources | $7685.83 |
| Less Est. Care Budget (320 hours p/mo) | −$6000.00 (Hourly Pay) |
| Resource Surplus Resource (Deficit) | $1685.83 SURPLUS |

One Year

| Resource | Est. Monthly Care Resource |
| --- | --- |
| Total LTC Resources | $7685.83 |
| Less Est. Care Budget (705 hours p/mo = 24 hours p/day) | −$7000.00 (Live-In Plus Care Management) |
| Resource Surplus Resource (Deficit) | $685.83 SURPLUS |

BERNICE'S CURRENT RESOURCES: Health Insurance—Bernice's primary health insurance is Medicare. She is enrolled in Medicare B. Bernice has a Medicare Supplement policy. Bernice is not enrolled in Medicare D. She does not have a prescription benefit.

Long-Term Care Insurance: Bernice does not have long-term care insurance coverage.

Veterans Benefits: Bernice is not a veteran. She is not a deceased veteran's spouse. She is not eligible for benefits.

Income: Bernice receives $790 per month in fixed income (Social Security Retirement). Wilbur receives $1,150 per month in fixed income (Social Security Retirement, Pension). Bernice has no pension income. Wilbur has $150 in pension income.

Assets: Bernice has $20,000 in available liquid assets in her name only. Bernice has $2000 cash value in life insurance. Bernice and Wilbur have $27,000 in available liquid assets owned jointly. Wilbur has $2,000 in available liquid assets in his name only. Wilbur has $8000 cash value in life insurance. Bernice has no available liquid assets held jointly with an adult child.

Community Supports: Bernice has transportation assistance, but no home modification assistance, housing subsidy, meal delivery, meal preparation, laundry service, shopping service, personal care services, income supports, chore services, cleaning services or pharmaceutical assistance, through either local, state or federal programs.

Social Supports: Bernice and Wilbur are married and they live in Sheffield, Mass. Bernice is 80 years old. Wilbur is 81 years old. Bernice and Wilbur live together. Bernice and Wilbur own their own home. Bernice and Wilbur have three adult children, two daughters and one son. Two daughters and one son live within an hour of Bernice and Wilbur's home. An adult child who lives with a care receiver MAY qualify as a "caretaker child" under Medicaid rules. The caretaker-child exception rule governing Medicaid recovery for transfer of a primary residence holds that under certain permitted circumstances, transfer of a home to a so-called "caretaker child" is exempt from asset transfer penalties. A "caretaker child" is defined as a child of the Medicaid applicant who lived in the applicant's primary residence for at least two years prior to the applicant's institutionalization and who during that period provided care that allowed the applicant to avoid a nursing home stay.

Housing: The primary residence is jointly held between spouses and is currently valued at $200,000. Bernice and Wilbur own 100% of the home's equity. Bernice and Wilbur live in a 2-story, 3-bedroom home with 1 full bathroom. There are stairs to the bedrooms. They have no first floor bedroom. They have no first floor bathroom. The full bath is not accessible (does not admit a wheelchair; crowded for 2 people). Some passageways present obstacles (aside from stairs) to a wheelchair. There are 3 stairs to climb to enter their home from outside. There is not currently an adequate ramp for wheelchair access from outside. The exterior lighting is adequate. Bernice and Wilbur live in a suburban setting.

Advance Directives: Bernice has a health care proxy, but does not have a living will, power of attorney, will or Do Not Resuscitate Order. Wilbur has a health care proxy, but does not have a living will, power of attorney, will or Do Not Resuscitate Order.

BERNICE'S RESOURCE DEVELOPMENT OPTIONS: Personal Resources—Income—Bernice and Wilbur's total fixed income is $1940 per month. Their monthly cost-of-living is approximately $1800. Bernice and Wilbur currently have $140 extra monthly income to pay for additional care she may need. With some planning, Bernice and Wilbur's monthly income could be approximately $3,125 (+/−), giving approximately $1325.83 per month to pay for additional care she may need.

| Type of Income/Expense | Monthly Amount |
|---|---|
| Total Fixed Income (Couple) | $1940.00 |
| Potential Investment Income (5% Return on $59,000 Invested) | $ 245.83 |
| Reverse Mortgage Income ($764.00 – $940.00 per month)* | $ 940.00 |
| Potential Total Monthly Income | $3125.83 |
| Monthly Cost-of-Living | –$1800.00 |
| Potential Monthly Income Available to Pay For Care | $1325.83 |

Personal Resources—Assets: Bernice and Wilbur have $59,000 in available assets and $200,000 in home equity. They could use these assets as follows: a. Invest their assets and use the income to pay for Bernice's care; b. spend down their savings; lump sum loan—Reverse Mortgage, Home Equity, New Mortgage; and/or establish a line of credit.

It is not possible to determine exactly how long Bernice and Wilbur's money would last if they spent down their savings on Bernice's home health care. Here are a few estimated examples of how long Bernice and Wilbur's money might last:

| Type of Care | Hours p/day | Days p/wk | Cost p/hour | Years Assets Would Last |
|---|---|---|---|---|
| Personal Care Only | | | | |
| Personal Care | 4 | 7 | $21 | 1.9 Years |
| Personal Care | 4 | 3 | $21 | 4.5 Years |
| Personal Care PLUS Homemaking | | | | |
| Personal Care | 4 | 3 | $21 | |
| Homemaking | 4 | 3 | $17 | 2.5 Years |
| Live-In Aide Services | 24 | 5 | $175 p/day | 1.3 Years |

These cost-of-care estimates are offered to help in the home care budgeting process. They are not estimates of the actual amount or type of care Bernice may need. Bernice and Wilbur should consult with a home health care professional to develop Bernice's actual care plan. The cost of Bernice's care may be higher or lower depending on her region of residence, and whether Bernice and Wilbur hire their own caregivers or home care agency employees. Bernice and Wilbur's money will go further if Bernice receives some of the help she needs from family and friends.

BERNICE AND WILBUR'S FAMILY'S RESOURCES: Most long-term care is provided by family members and friends, who may provide hands-on care, homemaking, planning, housing or financial help. Bernice and Wilbur's family have indicated they can assist with Bernice's care for up to 168 hours per month. To develop Bernice's care budget, we have calculated the monetary value of her family's assistance at an average of the market rates for personal care and homemaking, as follows:

Family Contribution

| Family Caregiver | Weekly Availability | Est. Monthly Value |
|---|---|---|
| Spouse | 20 hours | $1680 |
| Daughter #1 | 10 hours | $840 |
| Daughter $2 | 10 hours | $840 |
| Total Family Care Budget | 168 hours per month | $3360 |

Bernice and Wilbur's family may want to help in planning Bernice's care. A conversation within the family, perhaps facilitated by a counselor or planner, may expand their choices. The following four areas should be addressed:

Advance Directives: An "advance directive" is an instruction that is written down and recorded prior to being needed. Examples of advance directives include a Last Will and Testament, a Power of Attorney, A Health Care Proxy (or Health Care Agent), a Do-Not-Resuscitate order (DNR) and a Living Will. Bernice has a health care proxy, but no living will, power of attorney, will or Do-Not-Resuscitate order. Bernice and Wilbur should consult with their lawyer, or a local estate planning/elder law attorney to review their advance directives as Bernice's care needs increase. Some changes may be necessary to ensure her wishes are carried out. Wilbur's advance directives should also be reviewed.

Advance directives usually assign decision-making authority to family members, and may protect Bernice's quality of life should she lose the ability to make decisions. When family cannot serve, some may choose to assign limited authority to friends, neighbors or perhaps a lawyer. Advance directives cannot usually be completed after an individual loses competence.

Financial Concerns: When facing a long-term care challenge, elders may be anxious to protect their life savings for their children and grandchildren. Families are often anxious to see their loved ones well cared for, regardless of the cost. Families frequently arrive at a compromise, but getting there may take some work. Long-term care planning cannot proceed without estimating the cost of care and determining the pay source. Once you know what you have to work with, you can decide how much care you can afford to pay for, and whether some care will need to be subsidized from other sources, such as your family, your friends or your community.

Housing Alternatives: For most of those who need care, the biggest decision is not whether the care will be provided at home, but rather whose home will it be provided in? There are four housing alternatives for home care: 1) the home of the care receiver, whether a house or an apartment; 2) the home of a loved one, perhaps that of an adult child, a sibling or friend; 3) supported living in community-based apartment programs, assisted-living and independent-living centers; 4) Roommate housing.

The first two options are the most common. The third is available to those who can afford it, and some subsidies do exist. The fourth is likely to become more prevalent over time.

Housing choices are driven by affordability, convenience and preference. For some, an extended family household, with or without professional care-giving support, will work fine. Others prefer to remain in their own homes apart from family, but possibly nearby. Every family has its limitations, and blending households is not always in the best interest of all concerned, including the person needing care. But home care is and will remain a family affair. For many families, blending households can be both emotionally satisfying and financially helpful.

Task Sharing: Organizing the care often falls to a "primary caregiver," usually a spouse or adult child living with the care receiver or nearby. The primary caregiver may volunteer, or sometimes he or she is selected, either by the person needing care or by family consensus. The primary caregiver often wears many hats. He or she may be the family reporter, hands-on caregiver, driver and escort (to the doctor's office, for example), decision-maker, Wilbur payer and so on.

But the primary caregiver will always need help. Being a family caregiver can be very stressful. So make sure that the primary caregiver in your family gets plenty of respite time and emotional support. This is especially true when caregivers must take family leave from work to care for an ailing relative.

HOUSING AND HOME MODIFICATION: Bernice and Wilbur own their primary residence. They live together. Bernice and Wilbur live in a 2-story, 3-bedroom home with 1 full bathroom. There are stairs to the bedrooms. They have no first floor bedroom. They have no first floor bathroom. The full bath is not accessible (does not admit a wheelchair; crowded for 2 people). Some passageways present obstacles (aside from stairs) to a wheelchair. There are 5 stairs to climb to enter their home from outside. There is not currently an adequate ramp for wheelchair access from outside. The exterior lighting is poor. Bernice and Wilbur live in a rural setting.

Home Modification Budget: Bernice and Wilbur's home may need some modification if it is to perform best in support of her care. The items listed below may need to be addressed, either now or at some point in the future. Bernice and Wilbur should consult with a physical therapist first to see if any changes are needed to the home. Expensive modifications may be avoided if durable medical equipment can overcome a problem. The following table indicates some of the modifications and/or equipment that Bernice and Wilbur may need. The estimated costs are offered in ranges, and will vary depending on modification challenges.

|  | May Be Needed | Estimated Cost |
|---|---|---|
| Modification |  |  |
| Accessible Bath | Yes | $5000-$15000 |
| Wheelchair Ramp (Ramp length—28 ft.) | Yes | $2000-$4000 (Based on 4 stairs above ground level) |
| Doorways Widened | No | $1000 per doorway |
| Improved Lighting | No | $1500-$3000 |
| Grab bars in Bath | No | $300-$1000 |
| Accessible Bedroom | Yes | Depends on adaptability of 1st floor; May be able to use existing room(s) |
| Stair Glide | Yes | $2000-$4000 |
| Exterior Lighting | No | Depends on wiring needs $1500-$3000 |
| Equipment |  |  |
| Wheelchair | Yes | Insurance coverage likely |
| Lift Chair | Yes | Partial Insurance coverage likely |
| Hoyer Lift | No | Insurance coverage likely |
| Estimated Total |  | $9000-$23000 |

Home Modification Subsidy Programs: Bernice and Wilbur may qualify for a low interest or no interest loan through a home loan modification program in their area. A contact for the program is included at the end of this report.

Alternative Housing Budget: Bernice and Wilbur's may wish to consider relocating to alternative housing. The following list of options includes estimated cost, affordability and list of benefits. To calculate the number of months of affordability, we applied the following formula: *Monthly Cost of Housing MINUS Monthly Fixed Income=Monthly Cost Differential. 50% All Assets (Including Home)+Monthly Cost Differential=Months Affordable

| Type of Housing | Avg. Monthly Rent/Fees | Months Affordable* | Benefits |
|---|---|---|---|
| Subsidized Seniors Housing (@ 30% of Fixed Income) | $582 | Affordable indefinitely | Includes utilities; Accessible; Central Location |
| Caregiver Homes* | Not Applicable | N/A | N/A |
| Independent Living (Couple) | $2200 | X months | Includes utilities, meals, housekeeping, some transport, socialization, activities |
| Assisted Living (Couple) | $4000 | X months | Includes utilities, meals, housekeeping, some transport, socialization, activities, minimal personal care (½ hour per day +/−) |

Technology: Bernice is currently experiencing some cognitive, sensory or orientation impairment The following list of technology supports may be useful in lowering the cost of Bernice's home care. Bernice and Wilbur should consult with a home care professional or their physician before acquiring these systems. Referrals for doing so are included at the end of this report.

| Technology | Est. Monthly Cost | Estimated Purchase Price |
|---|---|---|
| Emergency Response System | $30 Lease (May be covered by Medicaid) | N/A* |
| Home Monitoring System: |  |  |
| Equipment | N/A* | $500 |
| Monthly Hi-Speed Internet Access | $50 | (Includes 2 wireless cameras, Modem Interface, 2 wireless motion sensors) |
| Wireless Video Monitor |  | $125 |
| Telemedicine: |  |  |
| Rental Fee Plus RN Monitoring | $300 |  |
| Total Technology Cost | $380 | $625 |

*Leases and/or purchases indicated for budgeting purposes. Bernice and Wilbur may choose either option for all equipment.

COMMUNITY RESOURCES: At the present time, Bernice lives in a "community setting" (her own home) with her husband, Wilbur. There is local, state and federal programs that could help them pay for Bernice's care in their home. Here we will address a few of these programs. The first is a partially state-funded, partially federally-funded health insurance program called Medicaid.

Community Medicaid: Since Bernice lives at home, she may be eligible for Community Medicaid. Since Bernice and Wilbur are married, the couple's income and assets will be assessed in determining Bernice's eligibility. Community Medicaid could help Bernice to remain at home by subsidizing various services, including, but not limited to Medicare Part B subsidy, pharmaceutical assistance, transportation, personal care assistance, respite services, adult day health, emergency response system, and so on.

In Massachusetts, there are three types of Community Medicaid programs for which Bernice might qualify, MassHealth Standard Program (for individuals over age 65), the Personal Care Attendant Program (PCA or "Hermanson" Program) (over age 60), and the Massachusetts Frail Elder Medicaid Waiver (over age 60). MassHealth Standard Program Married couples may have up to $1,157 (including disregard) in combined monthly income and up to $3,000 in assets to qualify for Medicaid under the MassHealth Standard. Applications may be made directly by client. Income Eligibility Analysis—MassHealth Standard Program. Bernice and Wilbur's combined gross monthly income is as follows:

| | |
|---|---|
| $790 per month Social Security + $93 Medicare B premium = | $883.00 |
| $1,000 per month Social Security + $93 Medicare B premium = | $1093.00 |
| Other Income | $150.00 |
| Total Combined Income | $2126.00 |
| Less Income Spenddown threshold | −$670.00 |
| Monthly Income in Excess of Limit | $1456.00 |
| Six month multiplier | ×6 |
| Total 6-month Deductible | $8736.00 |

Bernice and Wilbur's income exceeds the eligibility limit. To become eligible for MassHealth Standard, each month they must meet a monthly deductible or "spend down" equal to the difference between their gross monthly income and the income spenddown threshold. Thus, each month Bernice and Wilbur must spend $1456.00 on medically necessary services and/or products. These include, but are not limited to prescription drug costs, health insurance premiums, dental expenses, payments for durable medical equipment (wheelchair, hospital bed, etc.), eyeglasses, and so on.

Further, the state of Massachusetts requires senior citizens who exceed the income limit to meet their spend-down for a six-month period in one lump sum before they can become eligible for Medicaid for the balance of that six month period. For each succeeding six-month period, they must report this spend-down procedure. Thus, Bernice and Wilbur's community Medicaid spend down is $8736.00 ($1456.00 times six months equals $8736.00).

Asset Eligibility Analysis—MassHealth Standard Program. Bernice and Wilbur's $59,000 in assets exceeds the limit for Medicaid eligibility for an elderly individual living in a community or institutional setting. Assets not counted for Medicaid in Massachusetts are as follows: a. your home (if equity is below $750,000); b. one motor vehicle; c. $2000 available cash per individual, $3000 per couple; d. an irrevocable funeral reserve; e. burial space and marker; and, f. cash value in life insurance when face value of all policies is below $1500.

If all of Bernice and Wilbur's $59,000 in assets were kept in their name, and nothing was invested in non-countable assets, they would be $56,000 over the asset limit for Medicaid in a community setting ($59,000 minus $3000 allowable assets for a married couple equals $56,000.) Bernice and Wilbur could only become eligible for Community Medicaid by spending their excess assets, transferring their assets, either to an individual(s), a qualified trust(s) or an organization(s), or by purchasing a Medicaid-qualified annuity.

Personal Care Attendant Program (PCA or "Hermanson" Program): Married couples, one of whom is over age 60 and in need of a minimum 14 hours per week of personal care assistance may have up to $1,512 in monthly income and up to $3,000 in assets to qualify for Medicaid under the PCA (Hermanson) program. Applications may be made directly by client.

Income Eligibility Analysis—Personal Care Attendant Program (PCA or "Hermanson" Program): Bernice and Wilbur's combined gross monthly income exceeds the eligibility limit. Therefore, each month they must meet a monthly deductible or "spend down" equal to the difference between their gross monthly income and the income limit. Thus, each month Bernice and Wilbur must spend $614.00 on medically necessary services and/or products. These include, but are not limited to prescription drug costs, health insurance premiums, dental expenses, payments for durable medical equipment (wheelchair, hospital bed, etc.), eyeglasses, and so on.

Further, the state of Massachusetts requires senior citizens who exceed the income limit to meet their spend-down for a six-month period in one lump sum before they can become eligible for Medicaid for the balance of that six month period. For each succeeding six-month period, they must report this spend-down procedure. Thus, Bernice and Wilbur's community Medicaid spend down is $3684.00 ($614.00 time six months equals $3684.00).

Asset Eligibility Analysis—Personal Care Attendant Program (PCA or "Hermanson" Program): Bernice and Wilbur's $59,000 in assets exceeds the limit for Medicaid eligibility for an elderly couple, one or both applying, living in a community or institutional setting. The PCA program has the same asset eligibility rules for individuals as the MassHealth Standard (see above).

Massachusetts Frail Elder Medicaid Waiver: For married couples if only one spouse is requesting services, the spouse applying for benefits may have up to $1869.00 in monthly income. The income of the spouse who is NOT applying is disregarded. Married couples (both requesting services) may have up to $1869.00 each in monthly income. Applicant must be determined disabled and in need of high level of personal care assistance. Applications made through local Area Agency on Aging. Referral information provided below.

Income Eligibility Analysis—Massachusetts Frail Elder Medicaid Waiver: Bernice's fixed income is below the $1869 income limit. Wilbur's income is disregarded in determining Bernice's eligibility. Bernice may be eligible for the Frail Elder Waiver Program.

Asset Eligibility Analysis—Massachusetts Frail Elder Medicaid Waiver: Bernice is presently over the asset limit. Assets not counted for Medicaid in Massachusetts under the Frail Elder Waiver Program are as follows: your home (if equity is below $750,000); one motor vehicle; $2000 available cash per individual, per couple; assets of spouse when only one spouse is receiving services; an irrevocable funeral reserve; an irrevocable funeral fund; burial space and marker; and, cash value in life insurance when face value of all policies is below $1500.

If all of $59,000 in assets continue to be available to her, and nothing was invested in non-countable assets, they would be $57,000 over the asset limit for Medicaid under the Frail Elder Waiver Program ($59,000 minus $2,000 allowable assets for beneficiary equals $57,000). Bernice could only become eligible for Community Medicaid by moving all but $2000 of Bernice and Wilbur's joint assets into Wilbur's name only, by spending their excess assets, transferring their assets, either to an individual(s), a qualified trust(s) or an organization(s), or by purchasing a Medicaid-qualified annuity. If Bernice and Wilbur wish to transfer assets and apply for any type of Medicaid, we strongly recommend that no gifting to be done without the advice of an attorney familiar with the Medicaid program in Massachusetts. Massachusetts Office on Elder Affairs:

Bernice and Wilbur have an annual gross income of $23,712. They may qualify for assistance for the MA Home Care program. This program provides a monthly allotment of personal care assistance and homemaking (shopping, cleaning and laundry) for residents of MA who are over age 60. MassHealth members are financially eligible, as well as individuals with annual income less than $20,779, and couples with less than $29,403/couple. Monthly co-payments of $7-$135 are required for individuals with incomes that range from $9,139-$20,778 and couples with incomes that range from $12,253-$29,402.

MEDICAID PLANNING INFORMATION: Spending Money: Bernice and Wilbur could spend their money as they see fit for necessities such as home modification, consumer goods and other reasonable expenses. They could purchase an irrevocable burial trust through a funeral home, as well as establish an irrevocable funeral reserve in a savings account. Community Medicaid beneficiaries can own only one automobile. If Bernice and Wilbur wish to spend their assets and apply for Community Medicaid for Bernice, we strongly recommend that these expenditures be done after obtaining the advice of an attorney familiar with the Medicaid program in Massachusetts. Some expenditures are not allowable.

Asset Transfers: In Massachusetts, Community Medicaid under the MassHealth Standard, the PCA (Hermanson) program and the Frail Elder Waiver Program can be obtained with no wait period following asset transfers to individuals, organizations or Medicaid qualified trusts. However, in Massachusetts, Nursing Facility Medicaid (or Long Term Care Medicaid) requires that Medicaid applicants wait a certain period of time following an asset transfer before they can become eligible. Bernice and/or Wilbur transferred $20,000 to an individual 5 months ago. If either Bernice or Wilbur ever wish to apply for Medicaid, and if they have not done so already, they may wish to seek the advice of an attorney or a care manager familiar with the Medicaid program in Massachusetts to learn what, if any consequences may stem from this transfer.

Medicaid Qualified Annuities: Bernice could become eligible for Medicaid by purchasing a Medicaid-qualified annuity(s). Here again, if Bernice or Wilbur wishes to purchase such an annuity(s) and apply for Community Medicaid, we strongly recommend that she only do so on the advice of an attorney familiar with the Medicaid program in Massachusetts. The purchase of an annuity(s) will change Bernice's income and thus will affect eligibility for Medicaid. Bernice or Wilbur should only buy such an annuity(s) from a financial or insurance professional familiar with Massachusetts rules governing such annuities.

Medicaid-Qualified Trusts: A lawyer who is expert in Medicaid eligibility rules can advise Bernice and Wilbur if a Medicaid-qualified trust(s) would be an appropriate Medicaid planning tool for them. The rules governing the use of trusts are best explained by such an attorney. If Bernice and Wilbur do not have an attorney, they must find an elder law attorney in their area.

Medicaid and Home Ownership: Bernice and Wilbur own their primary residence. If Bernice applies for Medicaid, it is possible that the Commonwealth of Massachusetts could seek to recover some of the cost of her care from the equity in their home. A lawyer who is expert in Medicaid eligibility rules can advise Bernice and Wilbur if this could happen, and if an appropriate Medicaid planning tool could protect the home from such recovery. The rules governing home ownership and Medicaid recovery are best explained by such an attorney.

COMMUNITY CARE REFERRALS: Based on your responses, HomeCare Planner may make a variety of referrals that may be of assistance in helping Bernice and Wilbur execute their plan.

End of Example A

EXAMPLE B below illustrates a sample of tables only from the care funding and care plan options report 192 that is generated by the CFCP information exchange system 10. Text narratives of demographic variables, long-term care costs, care options, functional status and clinical variables, resource variables, family advisories, community resource eligibility rules, client community resource access planning steps, home modification recommendations, technology support options, and vendor referrals are summarized in the full report in EXAMPLE A above.

Start of Example B

Careplan Options Report

Re: Care Planning for Bernice
Date: Feb. 24, 2007
Bernice's Care Resources

| Resource | Description | Est. Monthly Care Resource | |
|---|---|---|---|
| Fixed Income (Couple) | 2200 p/mo Fixed Income | $140 | (Income Less Expenses) |
| Assets | $59,000 available liquid assets | $245.83 | (@5% P/Mo)* |
| Long-Term Care Insurance | NONE | 00 | |
| Home Equity | $200,000 in home equity | $940 | (Rev. Mtg.)* |
| Family | Spouse; 2 Dtrs. - Hours Available p/mo - 168 | $3360 | (In-Kind Svcs) |
| Community Programs | Possible Medicaid Waiver; Home Care Program; VA Benefits | $3000 | |
| Total LTC Resources | | $7685.83 | |

Bernice's Estimated Cost of Care

| Functional Task | Indep. | Needs Some Assist (Est. Monthly Hours) | Needs Full Assist (Est. Monthly Hours) | Estimated Monthly Cost |
|---|---|---|---|---|
| Bathing | | | 12.60 | $ 264.60 |
| Dressing | | 12.60 | | $ 264.60 |
| Toileting | ✓ | | | |
| Walking | ✓ | | | |
| Transfers (Bed to Chair/vice-versa) | ✓ | | | |
| Eating | ✓ | | | |
| Driving | | | 16.80 | $ 285.60 |
| Meal Preparation | ✓ | | | |
| Shopping | | | 12.60 | $ 214.20 |
| Cleaning | | | 12.60 | $ 214.20 |

-continued

| Functional Task | Indep. | Needs Some Assist (Est. Monthly Hours) | Needs Full Assist (Est. Monthly Hours) | Estimated Monthly Cost |
|---|---|---|---|---|
| Laundry | | | 12.60 | $ 214.20 |
| Making Appointments | ✓ | | | |
| Arranging Transportation | ✓ | | | |
| Wilbur Paying | ✓ | | | |
| Overnight assistance | ✓ | | | |
| Total | | 12.60 | 67.20 | $ 1457.40 |

Bernice's Potential Care Budget

| Resource | Est. Monthly Care Resource |
|---|---|
| Total LTC Resources | $7685.83 |
| Less Est. Care Budget | −$1457.40 |
| Resource Surplus Resource (Deficit) | $6228.43  SURPLUS |

Bernice's Prospective Careneeds Budgets

Three Months

| Resource | Est. Monthly Care Resource |
|---|---|
| Total LTC Resources | $7685.83 |
| Less Est. Care Budget (160 hours p/mo) | −$3000.00 |
| Resource Surplus Resource (Deficit) | $4685.83  SURPLUS |

Six Months

| Resource | Est. Monthly Care Resource |
|---|---|
| Total LTC Resources | $7685.83 |
| Less Est. Care Budget (320 hours p/mo) | −$6000.00  (Hourly Pay) |
| Resource Surplus Resource (Deficit) | $1685.83  SURPLUS |

One Year

| Resource | Est. Monthly Care Resource |
|---|---|
| Total LTC Resources | $7685.83 |
| Less Est. Care Budget (705 hours p/mo = 24 hours p/day) | −$7000.00  (Live-In Plus Care Management) |
| Resource Surplus Resource (Deficit) | $ 685.83  SURPLUS |

Bernice's Resource Development Options

Personal Resources—Income

| Type of Income/Expense | Monthly Amount |
|---|---|
| Total Fixed Income | $1940.00 |
| Potential Investment Income (5% Return on $59,000 Invested) | $245.83 |
| Reverse Mortgage Income ($764.00-$940.00 per month)* | $940.00 |
| Potential Total Monthly Income | $3125.83 |
| Monthly Cost-of-Living | −$1800.00 |
| Potential Monthly Income Available to Pay For Care | $1325.83 |

Personal Resources—Assets

| Type of Care | Hours p/day | Days p/wk | Cost p/hour | Years Assets Would Last |
|---|---|---|---|---|
| Personal Care Only | | | | |
| Personal Care | 4 | 7 | $21 | 1.9 Years |
| Personal Care | 4 | 3 | $21 | 4.5 Years |
| Personal Care PLUS Homemaking | | | | |
| Personal Care | 4 | 3 | $21 | |
| Homemaking | 4 | 3 | $17 | 2.5 Years |
| Live-In Aide Services | 24 | 5 | $175 p/day | 1.3 Years |

Bernice and Wilbur's Family's Resources

Family Contribution

| Family Caregiver | Weekly Availability | Est. Monthly Value |
|---|---|---|
| Spouse | 20 hours | $1680 |
| Daughter #1 | 10 hours | $840 |
| Daughter $2 | 10 hours | $840 |
| Total Family Care Budget | 168 hours per month | $3360 |

Home Modification Budget

| Modification | May Be Needed | Estimated Cost |
|---|---|---|
| Accessible Bath | Yes | $5000-$15000 |
| Wheelchair Ramp (Ramp length - 28 ft.) | Yes | $2000-$4000 (Based on 4 stairs above ground level) |
| Doorways Widened | No | $1000 per doorway |
| Improved Lighting | No | $1500-$3000 |
| Grab bars in Bath | No | $300-$1000 |
| Accessible Bedroom | Yes | Depends on adaptability of 1ˢᵗ floor; May be able to use existing room(s) |
| Stair Glide | Yes | $2000-$4000 |
| Exterior Lighting | No | Depends on wiring needs $1500-$3000 |

-continued

| | May Be Needed | Estimated Cost |
|---|---|---|
| Equipment | | |
| Wheelchair | Yes | Insurance coverage likely |
| Lift Chair | Yes | Partial Insurance coverage likely |
| Hoyer Lift | No | Insurance coverage likely |
| Estimated Total | | $9000-$23000 |

Alternative Housing Budget

| Type of Housing | Avg. Monthly Rent/Fees | Months Affordable* | Benefits |
|---|---|---|---|
| Subsidized Seniors Housing (@ 30% of Fixed Income) | $582 | Affordable indefinitely | Includes utilities; Accessible; Central Location |
| Caregiver Homes* | Not Applicable | N/A | N/A |
| Independent Living (Couple) | $2200 | X months | Includes utilities, meals, housekeeping, some transport, socialization, activities |
| Assisted Living (Couple) | $4000 | X months | Includes utilities, meals, housekeeping, some transport, socialization, activities, minimal personal care (½ hour per day +/−) |

*Monthly Cost of Housing MINUS Monthly Fixed Income = Monthly Cost Differential 50% All Assets (Including Home) + Monthly Cost Differential = Months Affordable
*The Caregiver Homes Program allows elders to remain at home under the care of family or non-family caregivers who receive a subsidy up to $18,000 per year. Beneficiaries must be Medicaid participants and in need of significant personal care assistance. Bernice and Wilbur do not qualify at the present time.

Technology

| Technology | Est. Monthly Cost | Estimated Purchase Price |
|---|---|---|
| Emergency Response System | $30 Lease (May be covered by Medicaid) | N/A* |
| Home Monitoring System: | | |
| Equipment | N/A* | $500 (Includes 2 wireless cameras, Modem Interface, 2 wireless motion sensors) |
| Monthly Hi-Speed Internet Access | $50 | |
| Wireless Video Monitor Telemedicine: | | $125 |
| Rental Fee Plus RN Monitoring | $300 | |
| Total Technology Cost | $380 | $625 |

*Leases and/or purchases indicated for budgeting purposes. Bernice and Wilbur may choose either option for all equipment.

End of Example B

The current CFCP system 10 invention utilizes the system processor means 36 including the above described knowledge-management software 36 to achieve improvements needed to overcome the problems created by the present non-standardized process of long-term care funding and care planning. Primary improvements include:

1. Eliminating inconsistencies in assessment protocols by providing case managers, social workers, legal professionals, financial professionals, health insurers, pension administrators and other advocates and agents of influence a standardized, downloadable checklist and interview format to complete for CFCP processing;

2. Eliminating inconsistencies in assessment protocols by providing case managers, social workers, legal professionals, financial professionals, health insurers, pension administrators and other advocates and agents of influence the standardized software integrated data map 16 to complete for CFCP processing;

3. Elimination of oversights and inaccuracies in long-term care advise, referrals, care-Funding information, and applications stemming from knowledge deficits of case managers, social workers, lawyers, financial planners, insurance planners, et al. by providing a software-based access to an accurate, comprehensive high-level data base of information about long-term care funding and care planning;

4. Diminishing the time and cost required to educate and engage long-term care consumers and the families of the chronically ill, the physically and cognitively disabled, and/or frail elders by making available written care funding and care-planning option reports for print, fax or by electronic mail immediately upon completion of the data map 16;

5. Expediting the application process for community-based and institution program supports, such as transportation programs, housing subsidies, heating assistance, home modification programs, nursing home care and so on, as well as reverse equity mortgages, Medicaid, and other benefits by automatic electronic population of application forms electronically immediately upon completion of the data map 16;

6. Reducing lag time between a long-term care client's developing the need for assistance with activities of daily living (bathing, dressing, toileting, walking, eating, transfers) and the acquisition of needed resources to pay for assistance by streamlining the application process for community and institution support programs, and by facilitating the budgeting process for the use of personal family and community (local, state and federal) resource in purchasing or providing needed personal care, supervision, medication monitoring, companion, home modification, and alternative housing and care services;

7. Reducing the incidence of unplanned hospitalizations and emergency room visits for those most at risk through improved provision of chronic-care services in community settings;

8. Reducing health care payer/provider resource expenditures for utilization of expensive inpatient and emergency care;

9. Increasing direct access by care receivers and consumers to knowledge and planning advice formerly available only by consultation with long-term care access professionals, making consumers better educated and better self-care managers.

The CFCP system 10 also provides access by Pension Benefit Administrators, Health Plan Administrators, Long-Term Care Insurance Administrators, Health System Professionals, Long-Term Care Facility Professionals (Nursing homes), Rehabilitation Facility Professionals, Home Health Agency Professionals (both Medical Home Care and Non-Medical Home Care), Disease Management Professionals, Employee Assistance Program Administrators, Estate Planning and Financial Planning Professionals, Social Service Professionals, Geriatric Care Managers, long-term Care Consumers and their families, and other advisors and agents of influence assisting chronically ill, or physically disabled, or cognitively disabled, or frail-elderly long-term care consumers, to a software-program based, long-term care funding care planning service in the form of the CFCP system 10. Data is processed through the CFCP system that generates unique, individualized, written, financial- and performance-based long-term care plans on how to best meet the needs of the care receiver in a community setting such as the care receiver's home, the home of a family member, or a least-restrictive setting such as an Independent Living or Assisted Living Facility or other long-term care facility.

While the present invention has been described with reference to various illustrative embodiments thereof, it is not intended that the invention be limited to these specific embodiments. Moreover, the present invention also includes methods of care planning and care funding described herein. Those skilled in the art will recognize that variations, modifications, and combinations of the disclosed subject matter can be made without departing from the spirit and scope of the invention as set forth in the following claims. The current CFCP system 10 may be available for the consumer and/or professional market under possible trademarks including "Community LifeCare Planner" or "HomeCare Bank Software".

What is claimed is:

1. A care funding and care planning system (10) for generating a care plan option report (192) for a care receiver, the system (10) comprising:
   a. a client computer (14) for receiving and storing care-receiver data, the client computer (14) including a user interface data map (16) configured to select predetermined care-receiver data (13) from a plurality of critical categories of care-receiver information, the care-receiver data (13) being received and stored by the client computer (14), wherein the critical categories of care-receiver information include the care-receiver's current physical functional status (72), current cognitive and sensory functional status (74), prospective functional status including physical, cognitive and sensory information (76), living environmental status abstractions (84), and long term care resource abstractions (88);
   b. a system processor (36) in communication with the care-receiver data (13) stored within the client computer (14), the system processor being configured to process the critical categories (72, 74, 76, 84, 88) of care-receiver information of the care-receiver data (13) through knowledge management software (12), the system processor (36) including data abstraction processing capability (24) configured to select and evaluate the care-receiver data (13) critical categories (72, 74, 76, 84, 88) of information to produce a current care needs budget (96) from the care-receiver's current physical functional status (72) and current cognitive and sensory functional status (74), a prospective care needs budget (114) from the prospective functional status (76), a home modification budget (118) from the living environmental status abstractions (84), and a summary of overall resources (150) from the long terra care resource abstractions (88), the budgets (96, 114, 118) and summary of overall resources (150) being referred to as care-receiver data abstractions (96, 114, 118, 150);
   c. a data base (48) in communication with the system processor (36) for providing values to the critical categories of information (72, 74, 76, 84, 88);
   d. a meta needs resource weighting engine (56) in communication with the system processor (36) and configured to weigh and process the care-receiver data abstractions (96, 114, 118, 150) to produce a summary care planning budget (160A, 160B, 160C, 160D, 160E, 160F) from the care-receiver data abstractions (96, 114, 118, 150) by processing the care-receiver data abstractions (96, 114, 118, 150) through at least one of Analysis A (164), Analysis B (172), Analysis C (182), Analysis D (184), Analysis E (210), and Analysis F (218); and,
   e. a report generating output (58) in communication with the system processor (36) and configured to produce the care plan options report (192) for the care receiver from the summary care planning budget (160A, 160B, 160C, 160D, 160E, 160F).

2. The care funding and care planning system (10) of claim 1, wherein the long-term care resource abstractions (88) include integration of community resources (91) including government funding sources available to the care receiver, financial resources (94) of the care receiver, and human resources (144) available to the care receiver.

3. The care funding and care planning system (10) of claim 1, wherein the meta needs resource weighting engine (56) includes integration of a home modification needs budget (118) with a care needs budget (96).

4. The care funding and care planning system (10) of claim 1, wherein the data base (48) includes information on vendors of services available to the care receiver including at least home care medical services, home modification and construction services and legal services.

5. The care funding and care planning system (10) of claim 1, wherein the data base (48) includes information on vendors of services available to the care receiver including at least home care medical and non-medical services, home modification and construction services, financial services, legal services, geriatric and disability care management services, mental health services, social services, health and long-term care insurance services, family caregiver support services, and long-term care community services.

6. A method of care funding and care planning (10) for generating a care plan option report (192) for a care receiver, the method comprising the steps of:
   a. entering care-receiver data (13) through a user interface map (16) of a client computer (14) to store the care-receiver data (13) within the computer (14), the user interface map (16) being configured to identify a plurality of critical categories of care-receiver information, wherein the critical categories of care-receiver information include the care-receiver's current physical functional status (72), current cognitive and sensory functional status (74), prospective functional status including physical, cognitive and sensory information (76), living environmental status abstractions (84), and long term care resource abstractions (88);
   b. producing care-receiver data abstractions (96, 114, 118, 150) by processing the care-receiver data (13) stored within the client computer (14) through knowledge management software (12) within a system processor (36) in communication with the care-receiver data (13), wherein the software (12) selects and evaluates information from the critical categories of care-receiver information (72, 74, 76, 84, 88) of the care-receiver data (13) to produce a current care needs budget (96) from the care-receiver's current physical functional status (72) and current cognitive and sensory functional status (74), a prospective care needs budget (114) from the prospective functional status (76), a home modification budget (118) from the living environmental status abstractions (84), and a summary of overall resources (150) from the long term care resource abstractions (88), the budgets (96, 114, 118) and summary of overall resources (150) being referred to as weighted care-receiver data abstractions (96, 114, 118, 150);

c. supplying factual information from a database (48) to the system processor (36), the factual information including information related to health care services, home modification services, legal services, and government funding services;

d. weighing and processing the weighted care-receiver data abstractions (96, 114, 118, 150) within a meta needs resources weighting engine (56) to produce a summary care planning budget (160A, 160B, 160C, 160D, 160E, 160F) from the care-receiver data abstractions (96, 114, 118, 150) by processing the care-receiver data abstractions (96, 114, 118, 150) through at least one of Analysis A (164), Analysis B (172), Analysis C (182), Analysis D (184), Analysis E (210), and Analysis F (218); and, e. producing the care plan option report (192) from the summary care planning budget (160A, 160B, 160C, 160D, 160E, 160F) and care-receiver data abstractions (96, 114, 118, 150) by directing the summary care planning budget (160A, 160B, 160C, 160D, 160E, 160F) into tables and text (190) within an analytic engine (58) for generating the report (192).

7. The method of care funding and care planning (10) of claim 6, wherein the step of supplying the information from the database (48) further comprises supplying information on vendors of services available to the care receiver including at least home care medical and non-medical services, home modification and construction services, financial services, legal services, geriatric and disability care management services, mental health services, social services, health and long-term care insurance services, family caregiver support services, and long-term care community services.

8. The method of care funding and care planning (10) of claim 6, wherein the step of weighing and processing the care-receiver data abstractions (96, 114, 118, 150) further comprises integrating the home modification budget (118) with the care needs budget (96).

9. The method of care funding and care planning (10) of claim 8, wherein the step of producing care receiver data abstractions (96, 114, 118, 150) by processing the care-receiver data (13) stored within the client computer (14) through knowledge management software (12) within a system processor (36) to produce the long-term care resource abstractions (88) further comprises integrating community resources (91) including government funding sources available to the care receiver, financial resources (94) of the care receiver, and human resources (144) available to the care receiver.

* * * * *